United States Patent
Brown et al.

(10) Patent No.: US 10,746,360 B2
(45) Date of Patent: Aug. 18, 2020

(54) LIGHTING SYSTEMS FOR USE IN RESIDENTIAL GARAGES AND OTHER LOCATIONS

(71) Applicant: ASSA ABLOY Entrance Systems AB, Landskrona (SE)

(72) Inventors: Joshua James Brown, Waukesha, WI (US); David Griffis, Sussex, WI (US); Maxwell MacLeay, Sussex, WI (US)

(73) Assignee: ASSA ABLOY Entrance Systems AB, Landskrona (SE)

(*) Notice: Subject to any disclaimer, the term of this patent is extended or adjusted under 35 U.S.C. 154(b) by 0 days.

(21) Appl. No.: 16/409,657

(22) Filed: May 10, 2019

(65) Prior Publication Data

US 2019/0346095 A1 Nov. 14, 2019

Related U.S. Application Data

(60) Provisional application No. 62/670,558, filed on May 11, 2018.

(51) Int. Cl.
| | |
|---|---|
| *F21S 4/28* | (2016.01) |
| *F21V 21/34* | (2006.01) |
| *F21V 23/00* | (2015.01) |
| *H02J 7/02* | (2016.01) |
| *F21Y 103/10* | (2016.01) |
| *F21Y 115/10* | (2016.01) |

(52) U.S. Cl.
CPC ............... *F21S 4/28* (2016.01); *F21V 21/34* (2013.01); *F21V 23/008* (2013.01); *H02J 7/025* (2013.01); *F21Y 2103/10* (2016.08); *F21Y 2115/10* (2016.08)

(58) Field of Classification Search
CPC ...... E05Y 2900/106; F21V 21/34; F21S 4/28; F21K 9/27
See application file for complete search history.

(56) References Cited

U.S. PATENT DOCUMENTS

| | | | | |
|---|---|---|---|---|
| 3,797,171 A | * | 3/1974 | Farmer ................. | E05F 15/676 49/360 |
| 5,154,509 A | * | 10/1992 | Wulfman .............. | F21V 21/096 362/227 |
| 6,346,889 B1 | * | 2/2002 | Moss ...................... | G08B 13/08 340/545.1 |
| 7,972,027 B1 | * | 7/2011 | Hatfield .................... | F21S 2/00 362/217.02 |
| 2008/0022596 A1 | * | 1/2008 | Boerger .................... | E06B 9/82 49/31 |
| 2009/0279298 A1 | * | 11/2009 | Mier-Langner ....... | F21V 21/096 362/235 |

(Continued)

*Primary Examiner* — Alexander K Garlen
*Assistant Examiner* — Eric T Eide
(74) *Attorney, Agent, or Firm* — Perkins Coie LLP

(57) ABSTRACT

Lighting units for use with garage door openers and associated door tracks in residential garages and other similar settings are described herein. In some embodiments, the lighting units can be easily attached to a door track by means of one or more magnets. In other embodiments, the lighting units can be easily daisy-chained together to provide increased lighting. Additionally, in further embodiments, lighting units described herein can be operably connected to a garage door opening system so that they operate in conjunction with the door opening system.

21 Claims, 20 Drawing Sheets

(56) References Cited

U.S. PATENT DOCUMENTS

| | | | | |
|---|---|---|---|---|
| 2011/0028006 A1* | 2/2011 | Shah | ................ | H05B 45/24 |
| | | | | 439/39 |
| 2011/0286208 A1* | 11/2011 | Chen | ................ | F21V 21/30 |
| | | | | 362/217.1 |
| 2014/0126199 A1* | 5/2014 | Heeter | ................ | F21V 21/08 |
| | | | | 362/223 |
| 2019/0264880 A1* | 8/2019 | Wang | ................ | F21S 2/00 |

* cited by examiner

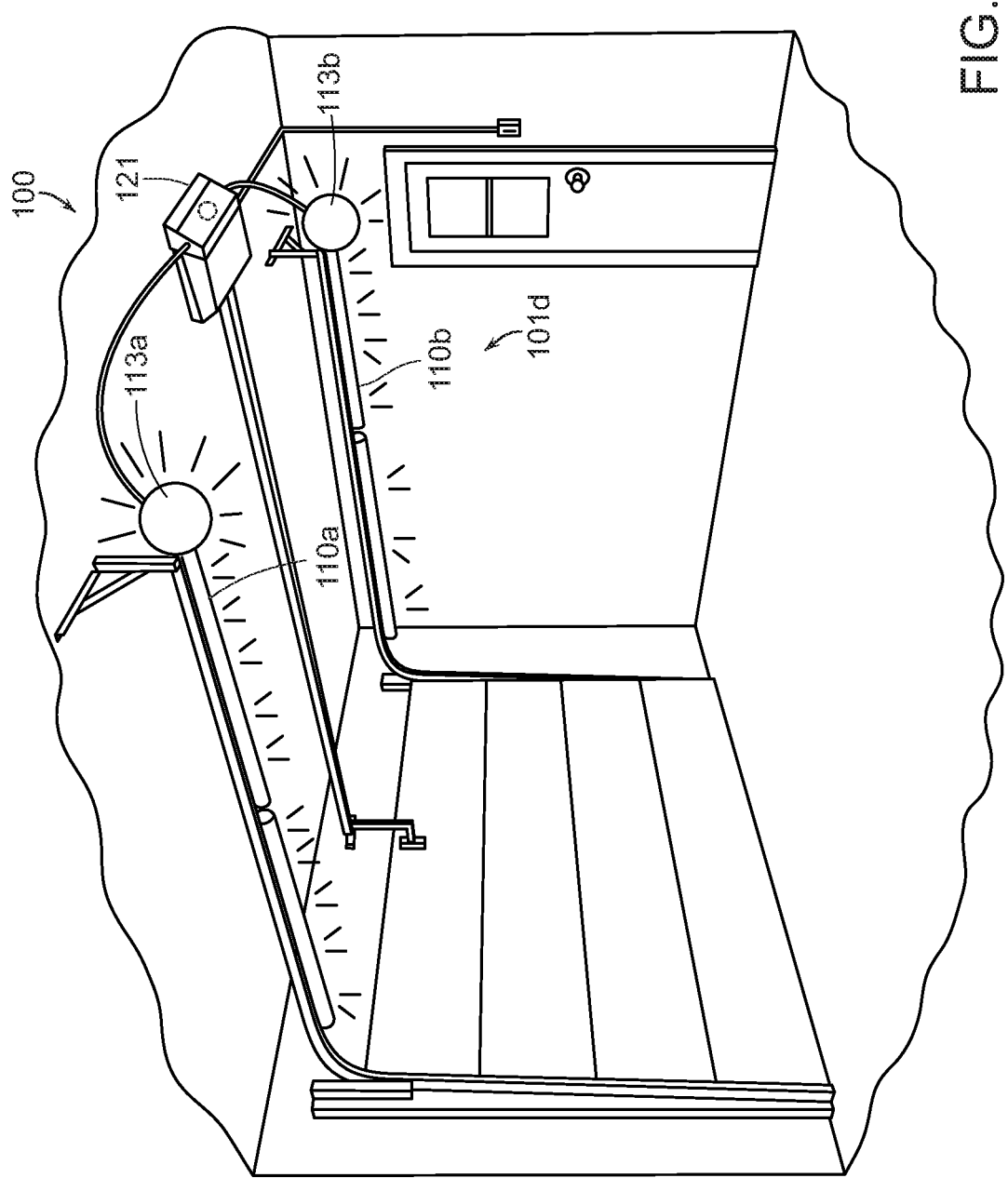

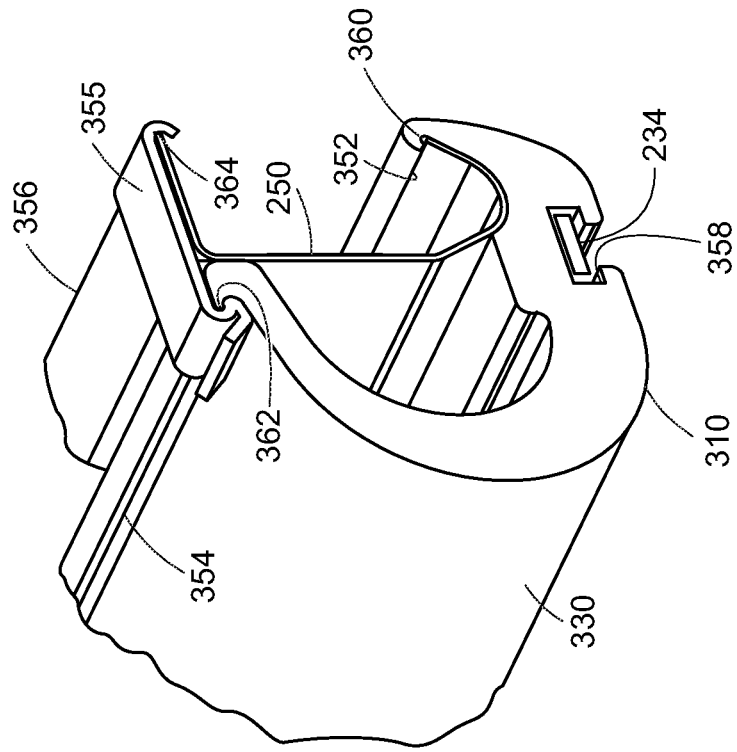
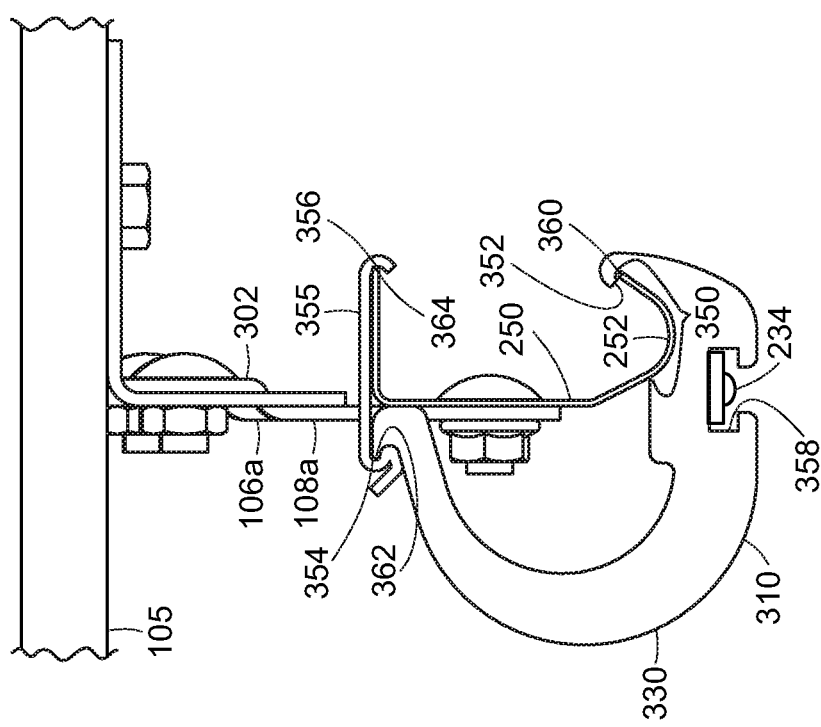
FIG. 3B
FIG. 3A

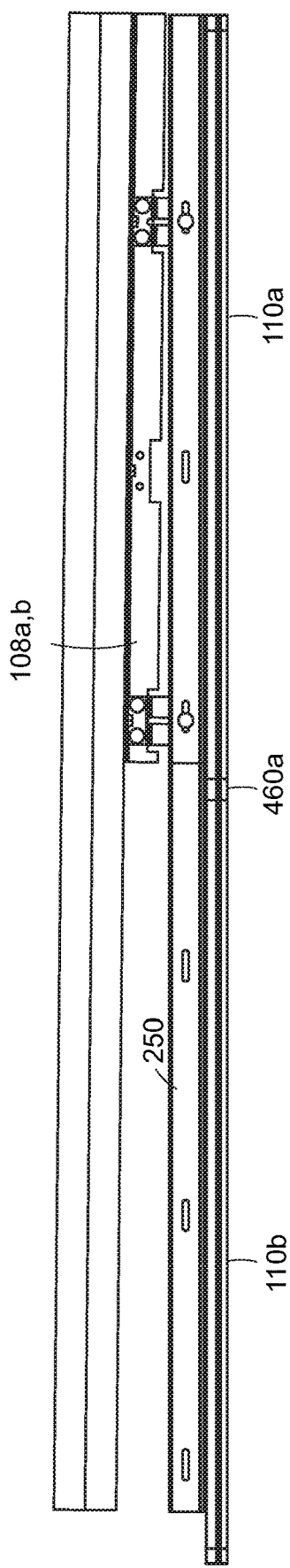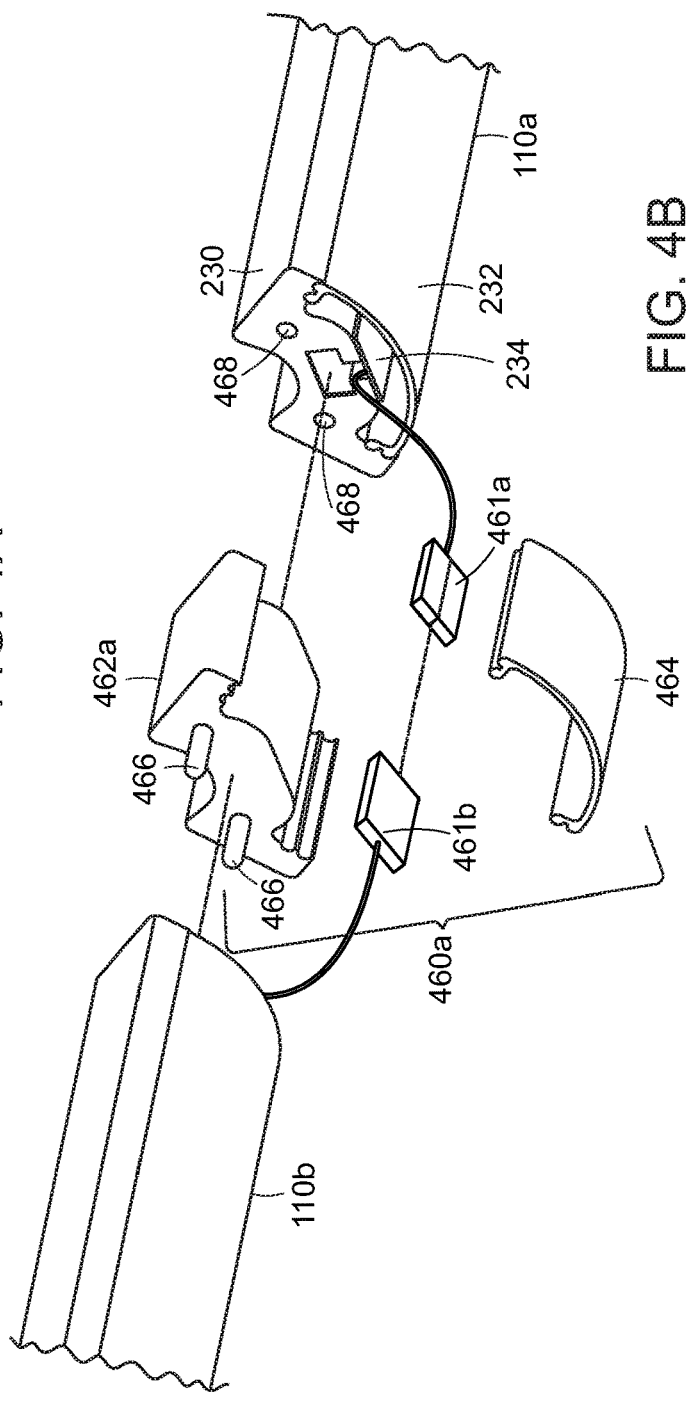

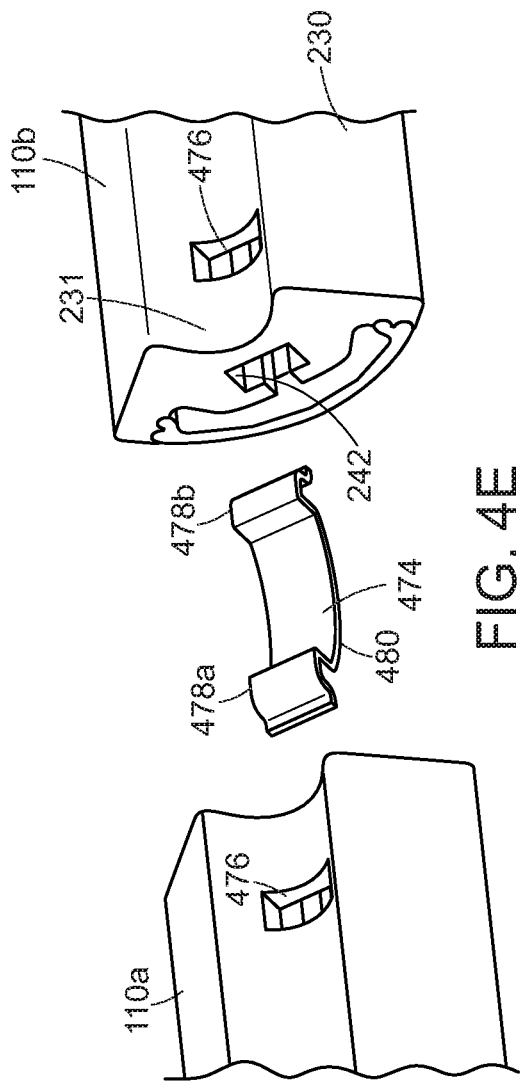
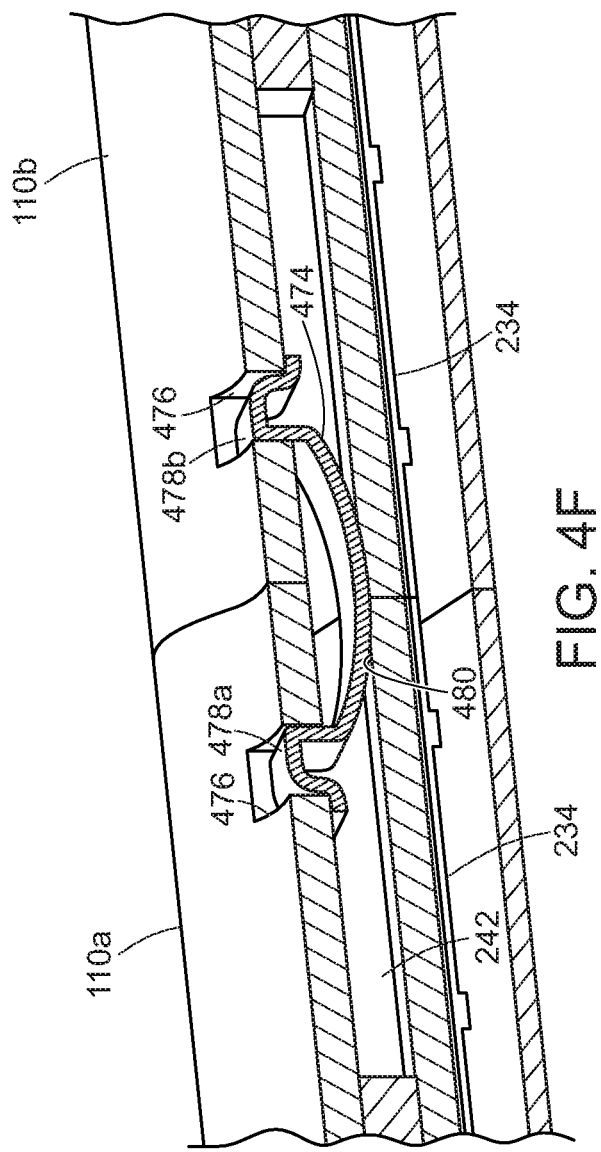

LIGHTING SYSTEMS FOR USE IN RESIDENTIAL GARAGES AND OTHER LOCATIONS

CROSS REFERENCE TO RELATED APPLICATION(S) INCORPORATED BY REFERENCE

The present application claims priority to U.S. Provisional Patent Application No. 62/670,558, filed May 11, 2018, and titled LIGHTING SYSTEMS FOR USE IN RESIDENTIAL GARAGES AND OTHER LOCATIONS, which is incorporated herein by reference in its entirety.

U.S. Provisional Patent Application No. 62/613,693, filed Jan. 4, 2018, and titled TRACK GUARD FOR OVERHEAD SECTIONAL DOOR, is incorporated herein by reference in its entirety.

TECHNICAL FIELD

The present disclosure is generally related to lighting systems and, more particularly, to lighting systems for use in residential and commercial garages and other similar locations.

BACKGROUND

Overhead doors, such as overhead sectional doors, have been used in residential and commercial garages for vehicle ingress and egress for many years. The two main functions of such doors are to provide a barrier to the outside environment when the door is closed, and to provide a portal for vehicle movement (e.g., an automobile) when the door is open. Conventional overhead sectional doors include four or more rectangular panel sections pivotally connected together along the upper and lower edges of the panels. Each of the panel sections typically carries one or more guide rollers extending outwardly from the side edges of the panel sections. The guide rollers are movably received in door tracks positioned on each side of the door. Each of the door tracks includes a vertical section attached to the door jamb and a horizontal section extending rearward into the garage above the door opening. The door tracks guide the door as it moves upwardly away from the door opening and into the overhead or "open" position, and as the door moves back down from the open position and into the "closed" position.

Conventional overhead doors can be susceptible to damage. For example, residents may inadvertently run into the door track when backing their automobile out of the garage. This can bend the door track out of alignment or otherwise damage the track, rendering the door inoperable and leading to time-consuming and costly repairs. Accordingly, it would be advantageous to provide improved lighting systems in residential garages and other similar locations to provide enhanced illumination for vehicle operators, and to provide other useful features and benefits of such systems.

BRIEF DESCRIPTION OF THE DRAWINGS

FIGS. 1A-1D are a series of isometric views of a garage having lighting systems configured in accordance with embodiments of the present technology.

FIG. 3A is a cross-sectional end view of a lighting unit configured in accordance with a further embodiment of the present technology, and FIG. 3B is an isometric view of a portion of the lighting unit of FIG. 3A.

FIG. 4A is a side view of a lighting system having two lighting units connected together with a coupling assembly configured in accordance with an embodiment of the present technology, and FIGS. 4C and 4B are exploded isometric views of lighting unit coupling assemblies configured in accordance with embodiments of the present technology.

FIGS. 4E and 4F are an exploded isometric view and a cross-sectional isometric view, respectively, of two lighting units coupled together with a mechanical coupling device configured in accordance with an embodiment of the present technology.

DETAILED DESCRIPTION

Figure 1A:
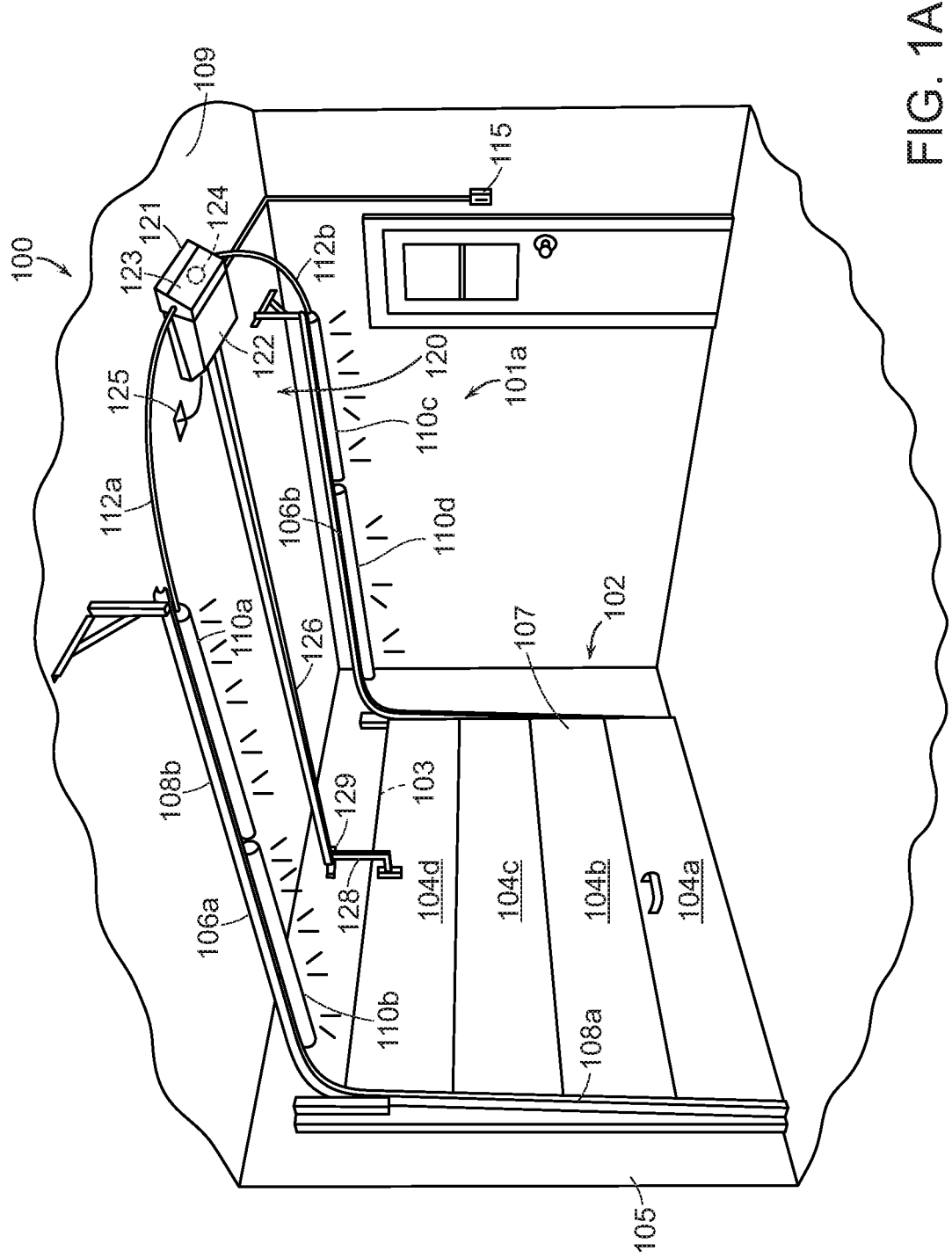

The following disclosure describes various embodiments of lighting systems that can be used in residential garages, commercial garages, loading docks and/or other similar settings. As described in greater detail below, in some embodiments the lighting systems include lighting units that can be mounted to, or near, overhead door guide tracks. In further embodiments, lighting units described herein can include features configured to protect the door tracks from damage while also providing illumination of the surrounding environment. For example, in some embodiments lighting units configured in accordance with the present technology can be magnetically attached to overhead door tracks to advantageously provide needed light without interfering with door operation. Additionally, in some embodiments the lighting units described herein can be operably connected to a door opening system so that the lights operate automatically in conjunction with the door opening system.

Certain details are set forth in the following description and in FIGS. 1A-10B to provide a thorough understanding of various embodiments of the present technology. In other instances, well-known structures, materials, operations and/or systems often associated with residential garages, overhead sectional doors, garage door openers and associated systems, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number generally refers to the Figure in which that element is first introduced. For example, element 110 is first introduced and discussed with reference to FIG. 1A.

Figure 1B:
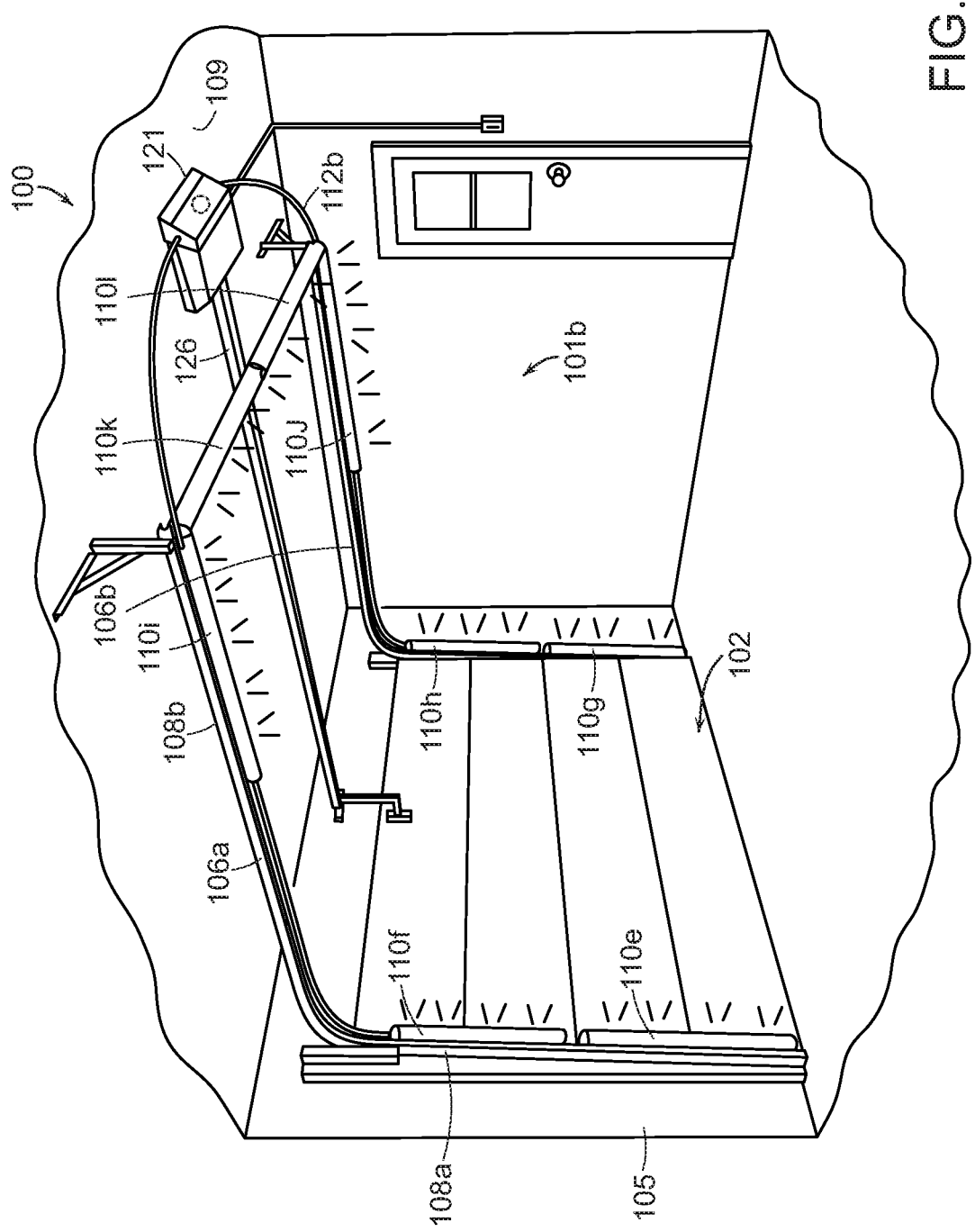
Figure 1C:
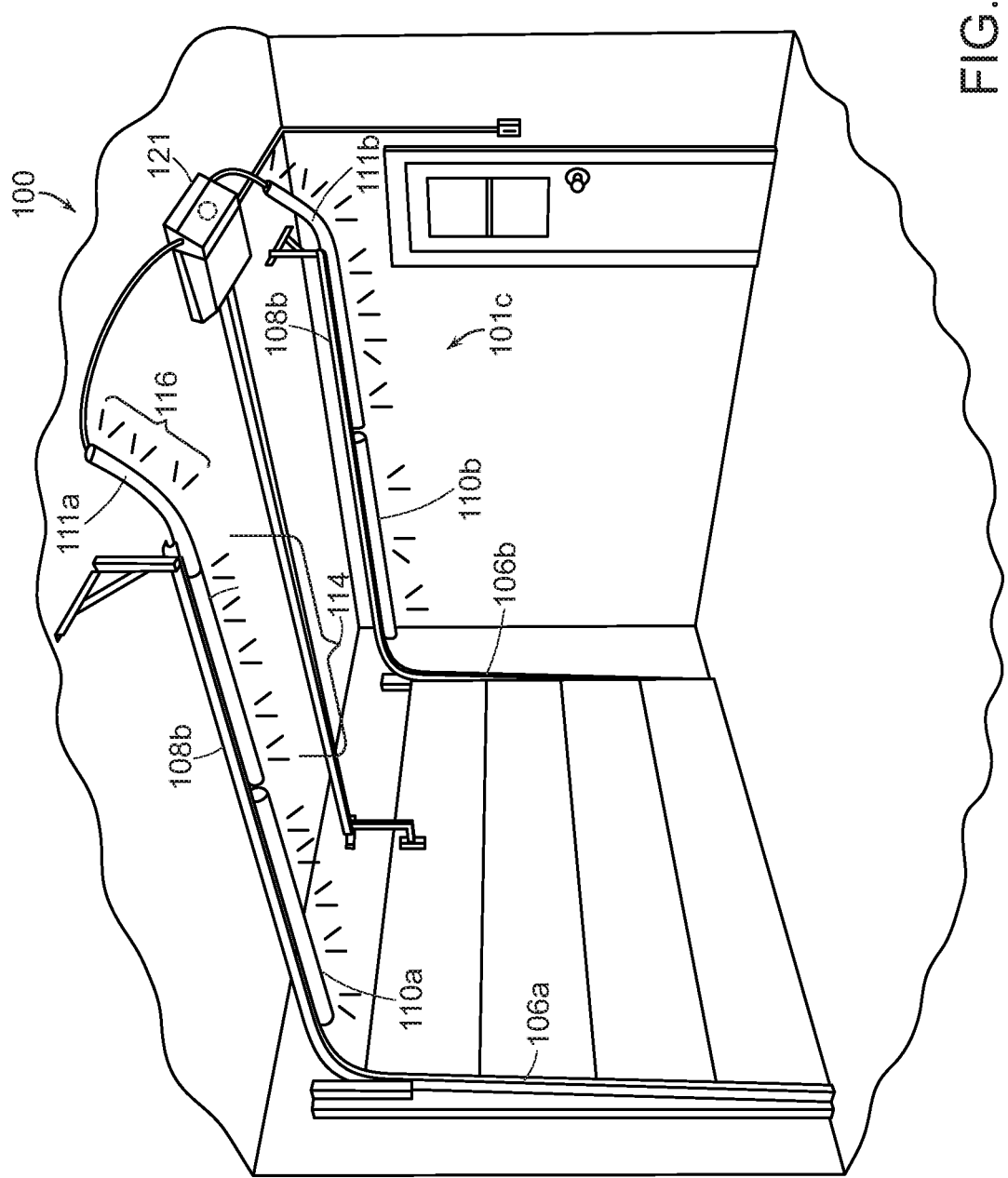

FIG. 1A is an isometric view of a garage 100 having a lighting system 101a configured in accordance with an embodiment of the present technology. FIGS. 1B-1D are additional isometric views of the garage 100 having lighting systems 101b-101d, respectively, configured in accordance with other embodiments of the present technology. Referring first to FIG. 1A, in some embodiments the garage 100 can be a residential garage that is at least generally similar in structure and function to conventional residential garages. For example, the garage 100 can include an overhead door assembly 102 having a door 107 configured to cover an opening 103 (e.g., a one- or two-car wide opening) in a front wall 105 of the garage 100. In the illustrated embodiment, the door 107 is an overhead sectional door having a plurality of rectangular door panels 104 (identified individually as door panels 104a-d) pivotally coupled together along upper and lower edges thereof in a conventional manner. Each of the door panels 104 can include at least one guide member (not shown) on the left and right side edges thereof that includes a roller movably received in an adjacent door track 106 (identified individually as a left side door track 106a and a right side door track 106b). Each of the door tracks 106 includes a vertical section 108a adjacent the opening 103 and a corresponding horizontal section 108b that extends rearward into the garage 100 above the opening 103.

In some embodiments, the overhead sectional door 107 can be operably coupled to an automatic garage door opener 120 in a conventional manner. More specifically, the garage door opener 120 can include a draw bar 128 having a first end portion that is pivotally coupled to the top door panel 104d, and a second end portion that is pivotally coupled to a shuttle 129. The shuttle 129 is slidably received in a horizontal channel or track 126 that extends between the front wall 105 and a door opener drive unit 121. The drive unit 121 can include an electric motor or other suitable drive system (not shown) positioned within a housing 122. In some embodiments, the drive system can be operably coupled to the shuttle 129 by means of a drive chain (not shown) that extends within the track 126 in a conventional manner. In other embodiments, the drive system can be operably coupled to the shuttle 129 by means of a drive screw that extends within the track 126 in a conventional manner. In addition to the drive system, the drive unit 121 can also include a light source 124 (e.g., a light bulb) enclosed behind a translucent or transparent (or semi-transparent) cover 123. Both the drive system and the light source 124 can be configured to receive power via an electrical outlet 125 (e.g., a conventional residential power outlet). Operation of the garage door opener 120 can be controlled via a conventional wall-mounted manual control switch 115, and/or a conventional hand-held wireless device (not shown) for remote control of the garage door opener 120 from, for example, within an operator's automobile.

In some embodiments, the door assembly 102 and/or the garage door opener 120 can be at least generally similar in structure and function to conventional door assemblies and garage door openers, respectively, known in the art. By way of example, such garage door openers and associated systems are disclosed in U.S. Pat. Nos. 3,996,697, 2,882,045, 3,061,758, 3,797,171, and 4,147,073; each of which is incorporated herein in its entirety by reference. In other embodiments, the lighting systems configured in accordance with the present technology and described in detail herein can be used with virtually any type of overhead door assembly and/or virtually any type of automatic garage door opening system. Accordingly, it should understood that the embodiments of lighting systems described herein are not limited to use with any particular type of door or door opening system, unless otherwise stated herein.

In one aspect of the present technology, the lighting system 101a can include a plurality of lighting units 110 (identified individually as lighting units 110a-110d) that can be easily mounted to the door tracks 106 (e.g. the horizontal sections 108b) without hindering operation of the door opener 120. In the illustrated embodiment, the lighting units 110 are elongate units that extend longitudinally along a portion of the length of the corresponding door tracks 106. Structures and associated methods for mounting the lighting units 110 to the door tracks 106, the wall 105, and/or a ceiling 109 are described in greater detail below with reference to, for example, FIGS. 2A-5C. In some embodiments, the lighting units 110 can be identical to each other, or at least generally similar to each other in structure and function. Accordingly, although individual lighting units may be identified herein as, for example, lighting unit "110a" or lighting unit "110b" to better identify a particular lighting unit or a particular lighting unit placement, it will be understood that unless otherwise specified herein lighting units having the same basic reference number (e.g., 110) are identical or are at least generally similar.

Each of the lighting units 110 can include one or more light sources configured to illuminate the area under the door tracks 106 to facilitate movement of vehicles into and out of the garage 100 and/or to facilitate other movements or operations of vehicles and/or people in the garage 100. More specifically, in various embodiments the lighting units 110 can be configured to project light in a diffuse manner, in a discrete manner (e.g., in a certain area, pattern, and/or shape), in different colors, and/or in flashing modes. The lighting units 110 can be used individually or daisy-chained together as needed for a particular application. The lighting units 110 can be of various lengths, such as from about one foot to about six feet, two feet to about five feet, or about three feet, as needed to facilitate installation, packaging or a particular use. As described in greater detail below, in some embodiments each of the lighting units 110 can be electrically connected to the door opener 120 and configured to receive operating power therefrom via a corresponding link 112 (e.g., a wired connection such as a power cord; identified individually as a first link 112a and a second link 112b).

The lighting system 101a can operate in some embodiments as follows. A person wishing to enter or leave the garage 100 via the opening 103 (in, for example, an automobile) can raise the door 107 by depressing or otherwise actuating the wall-mounted control switch 115, or by similar operation of a hand-held wireless remote control device. Upon activation, the drive unit 121 retracts the shuttle 129 (via, e.g., a chain, drive screw, etc.), thereby raising the door 107 into the overhead horizontal position in a conventional manner via the door tracks 106. Additionally, activation of the drive unit 121 can also energize the light source 124 as well as the lighting units 110, causing them to illuminate the garage 100. After moving through the opening 103, the person can lower the door 107 via the wall-mounted switch 115 (if, for example, the person parked in the garage 100) or via the hand-held device (if, for example, the person has exited the garage). Re-activation of the drive unit 121 drives the shuttle 129 and, likewise, the door 107 away from the drive unit 121 and back into the closed position shown in FIG. 1A. Depending on the particular application, the garage door opener 120 can be configured to delay turning-off of the light source 124 for a predetermined period of time (e.g., from about 10 seconds to about 5 minutes, or about 1 minute) after the door 107 has been closed. Similarly, in those embodiments in which the lighting units 110 are operably connected to the power circuit of the light source 124, the lighting units 110 will also remain on for the predetermined period of time after the door 107 has been closed.

FIG. 1A illustrates an embodiment of the present technology in which the lighting units 110 are mounted to the horizontal sections 108b of the door tracks 106, but the lighting units 110 described herein can be used in a wide variety of other arrangements and locations without departing from the spirit or scope of the present disclosure. FIG. 1B, for example, is an isometric view of the residential garage 100 in which a plurality of lighting units 110 (identified individually as lighting units 110e-110h) are operably mounted to the vertical sections 108a of the door tracks 106a and 106b, and at least a single lighting unit 110 (identified as lighting unit 110i and 110j) is mounted to the horizontal sections of the door tracks 106a and 106b. In use, the lighting units 110e-110j can provide illumination to the garage 100 as described above with reference to FIG. 1A, while at the same time acting as "track guards" that can protect the door tracks 106 from damage from inadvertent vehicle impact or other mishaps. Additionally, in this embodiment a plurality of lighting units 110 (identified individually as lighting units 110k and 110l) have been operably coupled together in an end-to-end arrangement and extend transversely between the lighting units 110i and 110j beneath the track 126. In some embodiments, all of the lighting units 110e-110l can be electrically connected to the door opener drive unit 121 to receive electrical power therefrom (e.g., individually or in series) as described above with reference to FIG. 1A. As the foregoing discussion illustrates, the lighting units 110 can be operably coupled to the door tracks 106 in a variety of different locations and arrangements, and/or can be operably positioned at various other locations in the garage 100 (e.g., mounted to the ceiling 109 or the front wall 105).

Although the lighting units 110 described above may be straight, or at least generally straight, in other embodiments lighting units configured in accordance with the present technology can have other useful shapes. As shown in FIG. 1C, for example, curved lighting units 111 (identified individually as lighting units 111a and 111b) can be operably mounted to the horizontal sections 108b of the door tracks 106. In the illustrated embodiment each of the curved lighting units 111 includes a first portion 114 that is mounted to the horizontal section 108b, and a second portion 116 that extends upwardly at an angle away from the end of the horizontal section 108b. In some embodiments, the second portions 116 enable the lighting units 111 to project light away from the door tracks 106 toward the rear of the garage 100 to better illuminate this area. FIG. 1D illustrates a further embodiment of the present technology in which additional lighting units 113 (identified individually as lighting units 113a and 113b) are operably coupled to end portions of the lighting units 110a and 110b. In some embodiments, the lighting units 113 can include spherical shapes that project light in an omnidirectional manner to further illuminate the garage 100 in accordance with the present technology. The lighting units 111 and 113 can be electrically connected to the door opener drive unit 121 to receive electrical power therefrom as described above with reference to FIG. 1A.

Figure 2A:
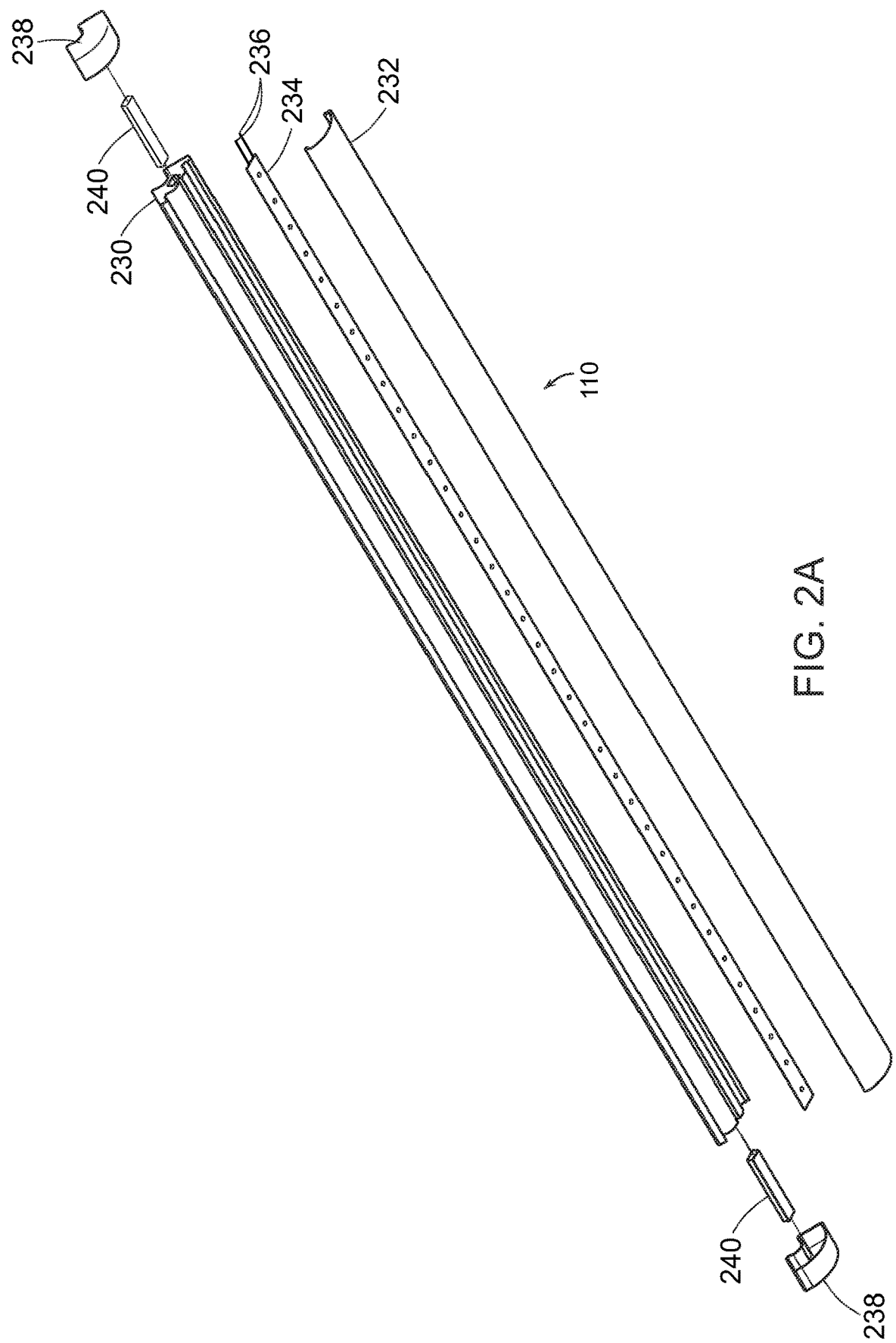
FIG. 2A is an exploded isometric view of a lighting unit configured in accordance with an embodiment of the present technology.
Figure 2B:
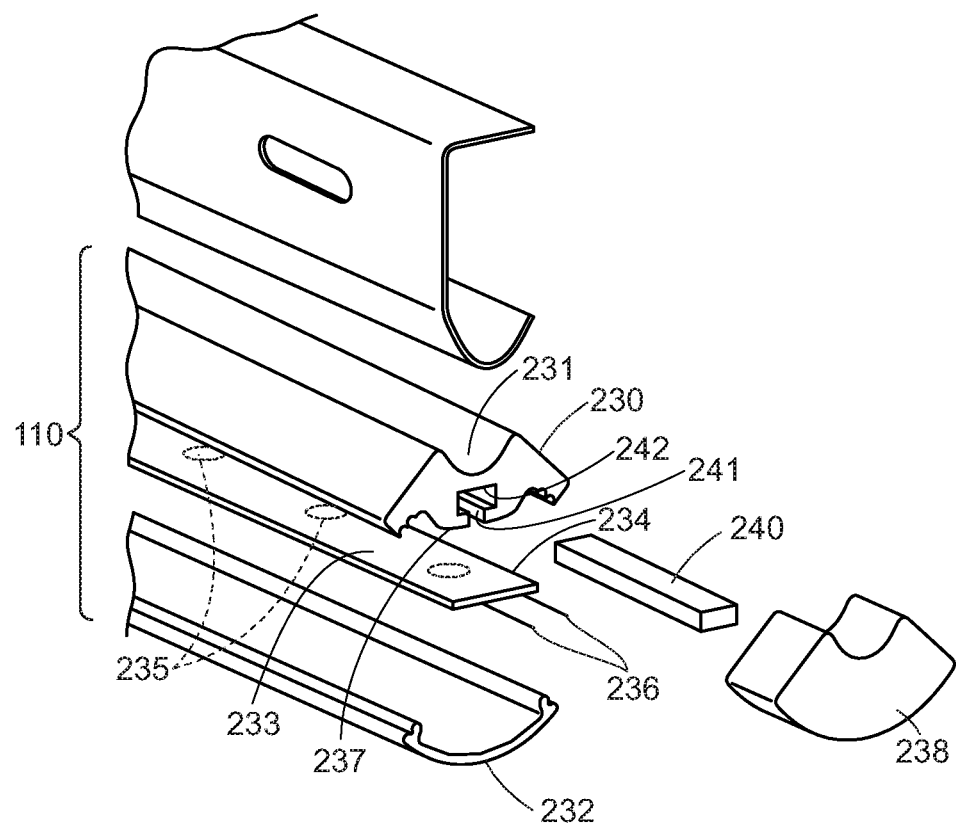
FIGS. 2B, 2C and 2D are an enlarged exploded isometric view, a cross-sectional end view, and an isometric view, respectively, of the lighting unit of FIG. 2A.
Figure 2C:
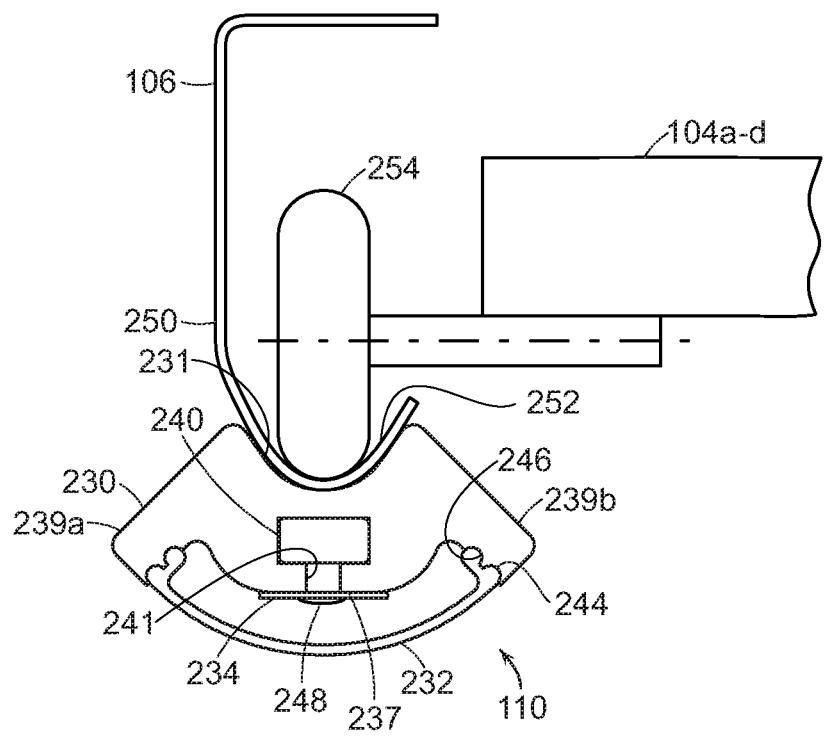
Figure 2D:
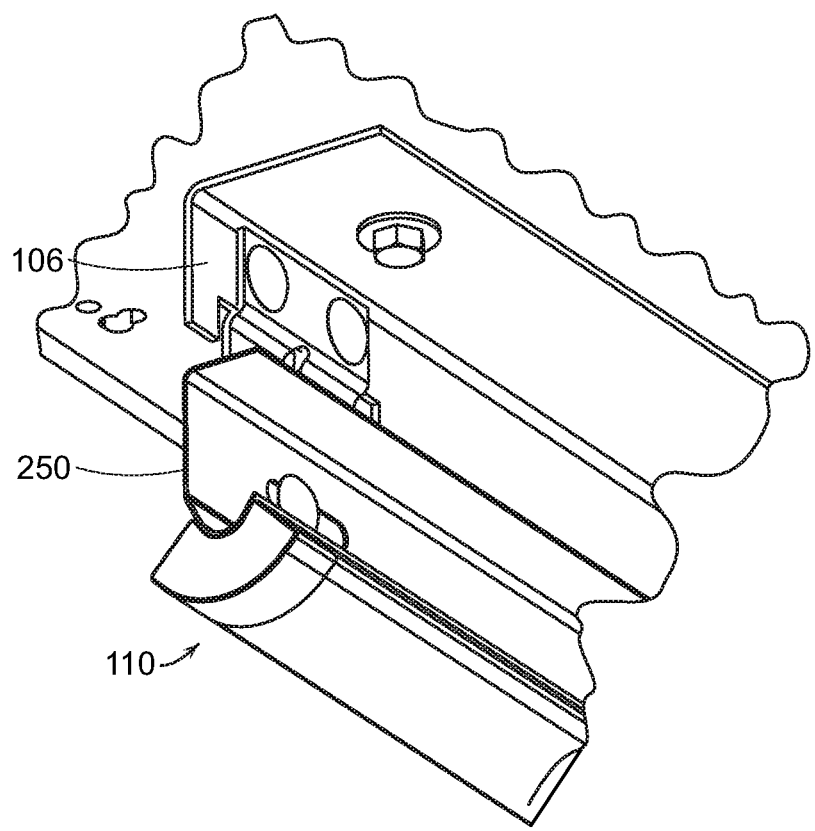

FIG. 2A is an exploded isometric view of the lighting unit 110 configured in accordance with an embodiment of the present technology, and FIG. 2B is an enlarged exploded isometric view of an end portion of the lighting unit 110. FIGS. 2C and 2D are a cross-sectional end view and an isometric view, respectively, of the lighting unit 110 mounted to the door track 106 in accordance with an embodiment of the present technology. Referring first to FIGS. 2A and 2B, in some embodiments the lighting unit 110 can include a translucent or transparent cover 232 (e.g., a transparent or semi-transparent plastic cover; which can also be referred to as a lens) configured to operably enclose an elongate lighting element 234 mounted to a base 230. As shown in FIG. 2B, in some embodiments, the lighting element 234 can be a light emitting diode (LED) light strip having a plurality of LEDs 235 mounted to a flexible circuit board 233. The lighting element 234 can further include two or more leads 236 for connecting the LEDs 235 to a suitable power source (e.g., the drive unit 121 described above in reference to FIG. 1A). In some embodiments, the LEDs 235 can be configured to display a single color (e.g., white) for illumination of the surrounding environment. In other embodiments, each of the LEDs 235 can be capable of displaying one or more colors (e.g., red, green, blue and/or white) depending on the voltage applied to the power inputs. In further embodiments, the LEDs 235 can be configured to flash, change color, dim, etc. by controlling the applied voltage via an associated microprocessor as is well known in the art. In yet other embodiments, the lighting unit 10 can include two or more LED light strips that create adjacent light rows extending longitudinally along the base 230. The light strips may be omnidirectional or unidirectional depending on the application.

Although some embodiments of the lighting units described herein can include LED light strips and/or other types of LED lighting elements by way of example, the lighting units described herein are not limited to use with LED lighting elements and systems. Accordingly, the structures and associated methods described herein for mounting lighting systems to, for example, a sectional door track in a residential garage, can be used with virtually any type of suitable lighting element known in the art. For example, in some embodiments the lighting units 110 and 111 can include incandescent lighting elements, fluorescent lighting elements, halogen lighting elements, metal halide lighting elements, etc. and/or any combination thereof. Additionally, in other embodiments the lighting units can include laser light systems that act as guide indicators for drivers. These lights could be interconnected with the garage door 107 and/or door opener 120 such that when the door is open, the guide lighting would be illuminated in, for example, a particular pattern or particular location that provides a visual guide for parking a vehicle in the garage 100.

In a further aspect of this embodiment, the lighting unit 110 can also include opposing endcaps 238 and one or more magnets 240. For example, in some embodiments the lighting unit 110 can include two magnets 240, with each magnet 240 being inserted into a portion of a cavity 242 proximate the opposite end portions of the base 230. In other embodiments, the lighting unit 110 can include more or fewer magnets 240 positioned in the cavity 242 at other locations along the length of the base 230. In some embodiments, the cavity 242 can be sized to retain the magnets 240 by means of a "press fit." Additionally, in some embodiments the base 230 can include a longitudinal slot 241 extending between an interior longitudinal surface 237 and the cavity 242. The slot 241 can provide access for a tool that an assembler can use to move one or more of the magnets 240 to a desired longitudinal position within the base 230. The slot 241 can also provide access for applying adhesive and/or a mechanical fastening device (e.g. a screw or bolt) to one or more of the magnets 240 if need to secure the magnet in position in addition to or in place of the press fit. Although not shown, the lighting unit 110 can further include an exterior power cord that is connected to the leads 236 via a suitable opening in one of the endcaps 238 and/or the base 230.

Referring next to FIG. 2C, in some embodiments the base 230 can have a constant cross-sectional shape defined by a concave exterior surface or recess 231 and sidewalls 239a and 239b extending from opposite sides thereof. The lighting element 234 can be securely attached to an interior longitudinal surface 237 located between the two sidewalls 239 by means of an adhesive (for example, if the LED light strip has an adhesive backing). In other embodiments, the lighting element 234 can be mounted to the surface 237 by means of a plurality of mechanical fasteners 248 (e.g., screws), or other suitable means of attachment. Additionally, the interior portions of the side walls 239 can include one or more grooves 246 configured to receive corresponding lips 244 or other edge features of the cover 232 to retain the cover 232 in place. In other embodiments, the cover 232 can be attached to the base 230 using other suitable means, including fasteners (e.g., screws, adhesive, etc.). In some embodiments, the base 230 can be made from ultrahigh molecular weight (UHMW) polyethylene. In other embodiments, the base 230 can be made from other suitable materials known in the art including, for example, other suitable plastics, metals, composites, etc. In still further embodiments, the base 230 can be made from or can include a fluorescent material, such that the material is passively illuminated when exposed to an external light, such as automobile lights.

Referring next to FIG. 2D in conjunction with FIG. 2C, as noted above in reference to FIG. 1A, the left and right sides of each door panel 104 can include at least one guide member having a roller 254. Further, each door track 106 can include a corresponding guide rail 250 that extends along the length of the door track 106 in a conventional manner. The guide rail 250 can include a corresponding guide portion 252 (e.g., a rounded groove) configured to receive the roller 254 and guide the door panels 104 as the door 107 (FIG. 1A) moves upwardly and downwardly into the open and closed positions. As further illustrated in FIGS. 2C and 2D, the recess 231 extends longitudinally along the length of the base 230 of the lighting unit 110 and has a complementary shape that is configured to receive and fit onto the exterior surface of the guide portion 252. In this position, the magnets 240 magnetically attract the guide rail 250, and the magnetic force enables the lighting unit 110 to be securely attached to the guide rail 250 (and, accordingly, the door track 106) at virtually any location along the length of the guide rail 250 without the need for mechanical fasteners (e.g., screws, bolts, etc.) or other mechanical attachment or fastening means. Additionally, as can be seen by reference to FIGS. 2C and 2D, the lighting unit 110 can be easily attached to the guide rail 250 in a position that provides full clearance for the door panels 240, and hence does not interfere with operation of the door 107. It should be understood that the lighting unit 110 can be mounted to the guide rail 250 at virtually any location along the door track 106 (horizontal or vertical) in the foregoing manner.

Although some embodiments of the lighting units described herein include magnets for attachment to door tracks or other structures, in other embodiments the magnets may be omitted and the lighting units can be attached to door tracks, walls, ceilings and other structures by mechanical fasteners (e.g., screws or bolts), adhesives, chains and/or hooks, or any combination of these attachment devices. In such embodiments, however, the lighting units can still be operably connected to the door opener drive unit 121 and operate to provide lighting, visual signals, etc. in the various manners and logic described herein.

Figure 2E:
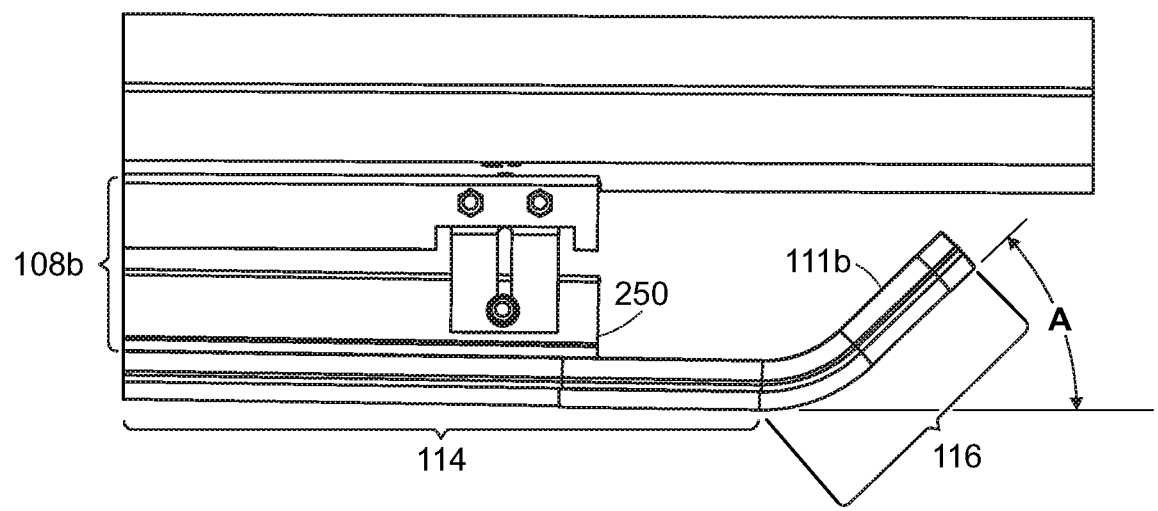
FIG. 2E is a side view of a lighting unit configured in accordance with another embodiment of the present technology.

FIG. 2E is a side view of the lighting unit 111b described above with reference to FIG. 1C. In the illustrated embodiment, the first portion 114 of the lighting unit 111b is mounted (e.g., magnetically attached) to the guide rail 250 of the horizontal section 108b of the door track 106b in the manner described above with reference to FIGS. 2C and 2D. The second portion 116 of the lighting unit 111b, however, extends upwardly and outwardly from the guide rail 250 at an angle A. By way of example, the angel A can range from about 10 degrees to about 90 degrees, or can be about 45 degrees. As described above with reference to FIG. 1C, this configuration enables the lighting units 111 to project light toward the rear portion of the garage 100 and better illuminate this area. Accordingly, although some lighting units configured in accordance with the present technology can be straight (e.g., as with the lighting units 110a-110c), other lighting units configured in accordance with the present technology can have non-linear configurations in which one portion of the lighting unit extends at an angle (e.g., horizontally or vertically) relative to another portion of the lighting unit.

FIG. 3A is a cross-sectional end view of a lighting unit 310 configured in accordance with another embodiment of the present technology, and FIG. 3B is an isometric view showing an attachment of the lighting unit 310 to the guide rail 250 of the door track 106 in accordance with an embodiment of the present technology. By way of example, the lighting unit 310 is illustrated in FIG. 3A as being mounted to the vertical section 108a of the left-side door track 106a, with the understanding that the lighting unit 310 can be mounted to the vertical section 108a and/or the horizontal section 108b of either or both door tracks 106 in virtually any location. Referring to FIGS. 3A and 3B together, in the illustrated embodiment the lighting unit 310 includes a base 330 having a first lip 352 adjacent an interior recess 350 (e.g., a longitudinal channel or groove), and a second lip 354 extending longitudinally along an opposite edge portion of the base 330. The base 330 further includes a generally rounded or convex exterior profile on a lateral portion thereof adjacent to an attachment feature 358. In the illustrated embodiment, the attachment feature 358 is a longitudinal channel or groove configured to receive the lighting element 234. The lighting element 234 can be secured to or in the attachment feature 358 by means of adhesive, a plurality of suitable fasteners, etc.

As noted above, the door track 106 includes the guide rail 250, which can be fixedly attached to the wall 105 of the garage 100 (or to the ceiling 109; FIG. 1A) by means of a plurality of brackets 302 or other suitable structures well known in the art. In this embodiment, the rounded guide portion 252 of the guide rail 250 is snuggly received in the recess 350 of the base 330 so that a longitudinal edge 360 of the guide rail 250 abuts or otherwise engages the first lip 352. Additionally, the base 330 is also attached to the guide rail 250 by means of a plurality of clips 355 that can be spaced along the length of the lighting unit 310. More specifically, the clips 355 can be made from a resilient material, such as spring steel, and can include a first groove 362 that receives and engages the second lip 354 of the base 330, and a second groove 364 that receives and engages a second edge 356 of the guide rail 250 to thereby securely "clip" the base 330 to the guide rail 250. In the foregoing manner, the lighting unit 310 can be easily secured to essentially any portion of the guide rail 250 along the length of the door track 106 without the need for additional fasteners (e.g., screw bolts, etc.), drilled holes, etc., and without interfering with operation of the door 107 (FIG. 1A). In use, the lighting unit 310 can provide illumination to the garage 100 as described above with reference to FIG. 1A, while at the same time acting as a "track guard" that can protect the guide rail 250 and/or other portions of the door track 106 from damage from inadvertent vehicle impact or other sources.

Figure 4C:
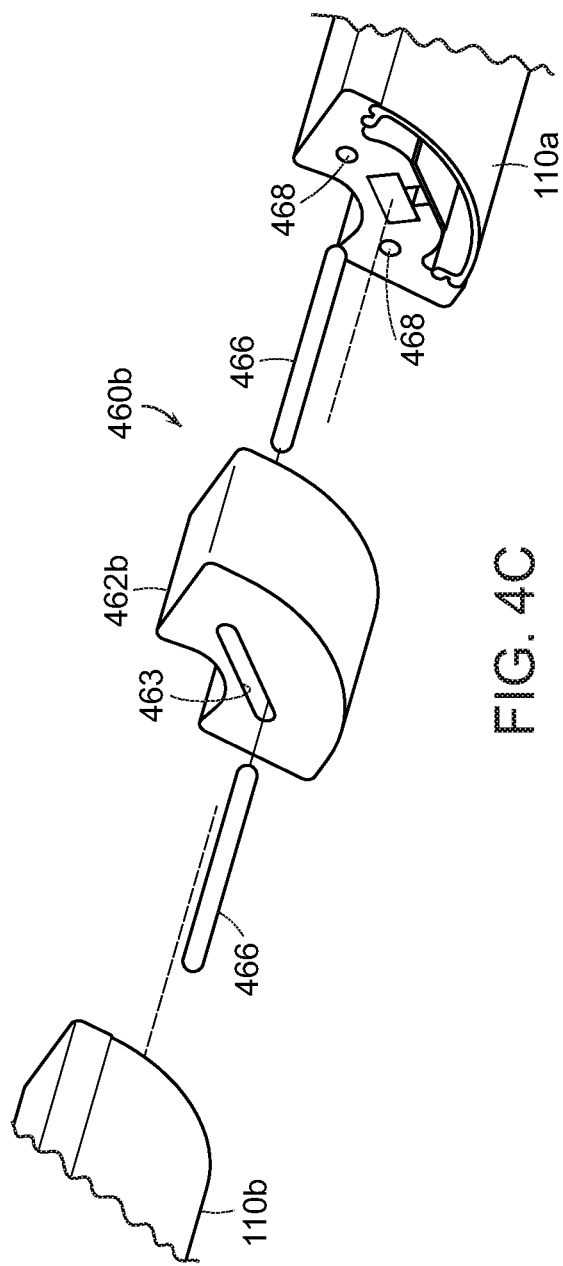

FIG. 4A is a side view of two of the lighting units 110 (identified individually as lighting units 110a and 110b) operably connected together by a coupling assembly 460a configured in accordance with an embodiment of the present technology, and FIG. 4B is an exploded isometric view of the coupling assembly 460a. FIG. 4C is an exploded isometric view of a coupling assembly 460b configured in accordance with another embodiment of the present technology. Referring first to FIGS. 4A and 4B, in some embodiments the first coupling assembly 460a can include a coupler 462a and a lens or cover 464. The coupler 462a can have the same profile and be made from the same material as the base 230 of the adjoining lighting units 110a and 110b. Accordingly, the coupler 462a can include grooves and/or other attachment features for attaching the cover 464 to the coupler 462a in the same manner as described above for attaching the cover 232 to the base 230 (FIG. 2C). The coupler 462a can further include one or more dowel pins 466 that extend outwardly therefrom and are configured to be tightly received in corresponding sockets or holes 468 formed in the adjoining bases 230.

To couple the lighting unit 110a to the lighting unit 110b as shown in FIG. 4A, the dowel pins 466 are inserted in to the holes 468, and the lighting element 234 of each of the lighting units can be electrically connected together via corresponding male and female connectors 461a and 461b, respectively. In some embodiments, the connectors 461a, b can include mechanical locking features that act as a strain relief between the two lightning elements 234 and protect the electrical connections. As a final step the cover 464 can be snapped into engagement with the coupler 462a so that the coupling between the adjoining lighting units 110a and 110b will have the same general appearance as the rest of the lighting unit.

Referring next to FIG. 4C, in this embodiment the coupling assembly 460b can include a coupler 462b that has an exterior cross-sectional shape that is essentially the same as the adjoining lighting units 110. The coupler 462b can also include a plurality of through holes or a single slot 463 through which a plurality of dowel pins 466 can extend. To couple the lighting unit 110a to the lighting unit 110b using the coupler 462b, the dowel pins 466 are inserted into the respective holes 468, and the bases 230 of the two lighting units 110 are pushed together to sandwich the coupler 462b therebetween. In some embodiments, friction between the dowel pins 466 and the holes 468 can hold the assembly together. In other embodiments, additional clips, fasteners, etc. can be used to hold the adjoining parts together.

The foregoing examples of coupling assemblies are but two examples of coupling assemblies that can be used in accordance with the present disclosure to couple two or more lighting units together in series. In other embodiments, rather than arranging the lighting units so that their ends abut, two or more lighting units can be positioned end to end on a door track with a space therebetween, and they can be electrically connected via, for example, the connectors 461a and 461b described above or via other suitable electrical connections.

Figure 4D:
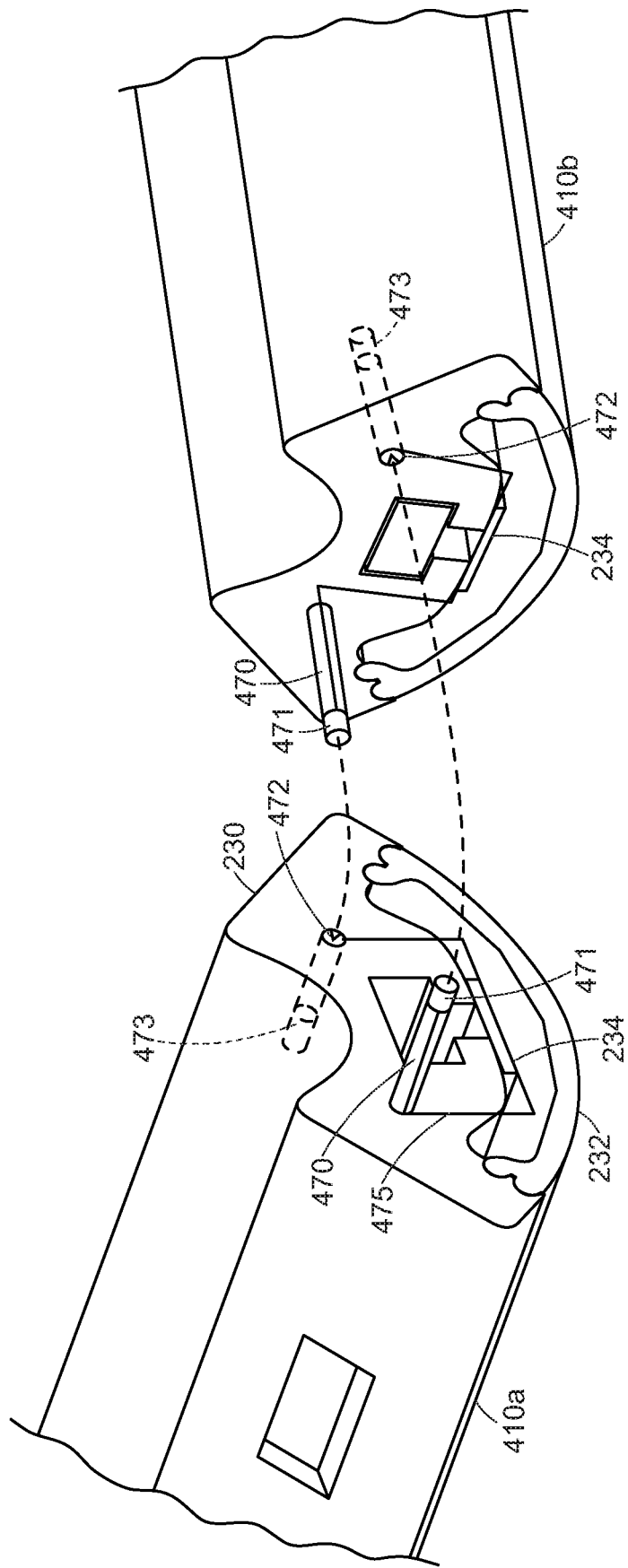
FIG. 4D is a partially schematic, partially exploded isometric view of two lighting units having connecting features configured in accordance with an embodiment of the present technology.

FIG. 4D is a partially schematic, partially exploded isometric view of two lighting units 410a and 410b having connecting features that enable the end portions of the lighting units 410a and 410b to be easily connected together without the need for an intervening coupling assembly, in accordance with an embodiment of the present technology. In the illustrated embodiment, the lighting units 410a and 410b can be identical, or at least generally identical to each other. Moreover, the lighting units 410a and 410b can be at least generally similar in structure and function to the lighting unit 110 described in detail above. For example, each of the lighting units 410a, b can include a base 230 and a transparent or semi-transparent plastic lens or cover 232 that encloses a lighting element 234 (e.g., a LED light strip). In this particular embodiment, however, each of the lighting units 410 further includes a prong 470 (e.g., a cylindrical member) extending outwardly from the end portion of the base 230, and a receptacle 472 (e.g., a cylindrical socket) extending into the end portion of the base 230. The receptacle 472 on one of the lighting units 410a, b can be aligned to receive the prong 470 on the adjoining lighting unit 410a, b when the two end portions of the lighting units 410a, b are pressed together, thereby creating a single elongated lighting assembly comprising the two lighting units 410a, b. Additionally, the receptacles 472 can be sized to provide a "press fit" that retains the corresponding prong 470 via friction to assist in holding the two lighting units 410a, b together.

In some embodiments, each of the prongs 470 and each of the corresponding receptacles 472 can include an electrical connector or contact so that the electrical power circuits of the two lighting units 410a, b are automatically connected when the two lighting units 410a and 410b are joined together as described above. For example, each of the prongs 470 can include a first electrical contact 471 that is configured to contact a second electrical contact 473 in the corresponding receptacle 472 when the prong 470 is fully inserted into the receptacle 472. Each of the contacts 471 and 473 can in turn be electrically connected (via e.g., a wire 475) to one or more of the electrical leads (not shown in FIG. 4D) of the corresponding lighting element 234. In some embodiments, when the prongs 470 and receptacles 472 are connected as described above they can provide the "hot" and "neutral" paths for the lighting element power circuit. In the foregoing manner, the two lighting units 410a and 410b can be easily mechanically and electrically joined together in an end-to-end arrangement.

FIGS. 4E and 4F are a partially exploded isometric view and a cross-sectional isometric view, respectively, of a pair of lighting units 110a and 110b mechanically coupled together with a connector 474 configured in accordance with an embodiment of the present technology. Referring first to FIG. 4E, in some embodiments each of the lighting units 110 can include an opening 476 (e.g., a rectangular opening) that extends through the base 230 from the recess 231 to the magnet cavity 242. In the illustrated embodiment, the connector 474 can take the form of a spring clip having a curved base portion 480 extending between raised end portions 478a and 478b. The connector 474 can be made of sufficiently strong and resilient material, such as spring steel.

As shown in FIG. 4F, the connector 474 can be used to connect the two lighting units 110a and 110b together by first inserting the connector 474 into the cavity 242 of one of the lighting units 110 (e.g., the lighting unit 110a) so that the first end portion 478a is firmly received in the opening 476 in the corresponding base 230. Next, the second end portion 478b of the connector 474 is inserted into the cavity 242 of the other lighting unit 110b, and the lighting unit 110b is moved toward the lighting unit 110a until the end surfaces of the two lighting units abut and the second end portion 478b is firmly received in the opening 476 of the lighting unit 110b. In this position, the lower surface portion of the cavity 242 presses against the base portion 480 of the connector 474 to bias the end portions 478a and 478b of the connector 474 toward the respective openings 476 to firmly retain the two lighting units 110a and 110b together. Although not shown in FIG. 4F, the lighting elements 234 of each of the lighting units 110a and 110b can be electrically connected together when the lighting units are joined by various means, including, for example, electrical connectors such as the connectors 461a and 461b described above with reference to FIG. 4B. To release the connector 474 and separate the lighting units 110a and 110b, a user can depress, for example, the first end portion 478a downwardly to move the end portion 478a out of the corresponding opening 476, and then pull the two lighting units 110a and 110b apart.

Figure 5B:
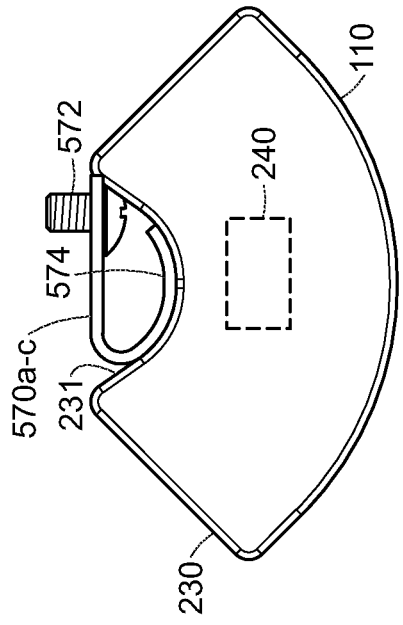
FIG. 5B is an end view of the wall-mounted lighting unit of FIG. 5A.

As noted above, some embodiments of the lighting units described in detail herein can be easily attached to overhead sectional door tracks without the need for screws or other types of threaded fasteners. In other embodiments, lighting units configured in accordance with the present technology can be attached to walls, ceilings, and/or other surfaces in the residential garage 100 and/or other locations using a variety of different attachment means. For example, FIG. 5A is an isometric view of the lighting unit 110 mounted to a wall (e.g., the front wall 105) in the residential garage 100 or other location using one or more brackets 570 (identified individually as brackets 570a-570c). FIG. 5B is an end view showing the lighting unit 110 attached to one of the brackets 570. In the illustrated embodiment, the bracket 570 can be formed from a ferromagnetic metal and can include a convex mounting surface 574 that is configured to be received in the recess 231 of the lighting unit base 230. Additionally, the bracket 570 can include provisions for one or more fasteners 572, such as a threaded fastener (e.g., a screw or a bolt). To mount the lighting unit 110 on to a wall, one or more of the brackets 570 can be fastened to the wall via the fastener 572 at an appropriate location so that each of the brackets 570 will be positioned adjacent to one of the magnets 240 in the lighting unit base 230. Once the brackets 570 have been installed on the wall, the lighting unit 110 can be easily attached to the brackets 570 by simply positioning the mounting surfaces 574 of the brackets 570 in the recess 231 in general alignment with the magnets 240 so that the magnetic attraction between the magnets 240 and the brackets 570 hold the lighting unit 110 in position.

Figure 5C:
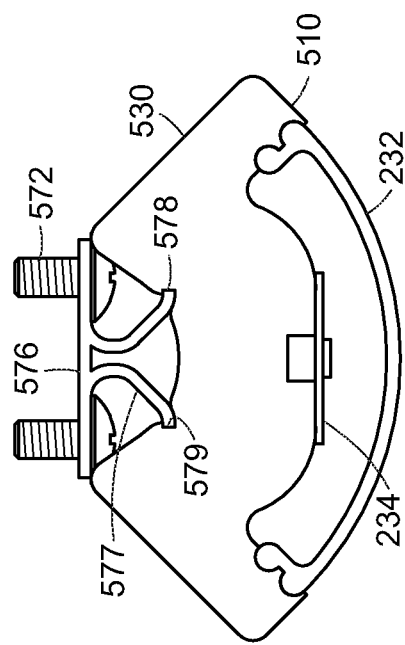
FIG. 5C is a cross-sectional end view of a wall-mounted lighting unit configured in accordance with another embodiment of the present technology.
Figure 5A:
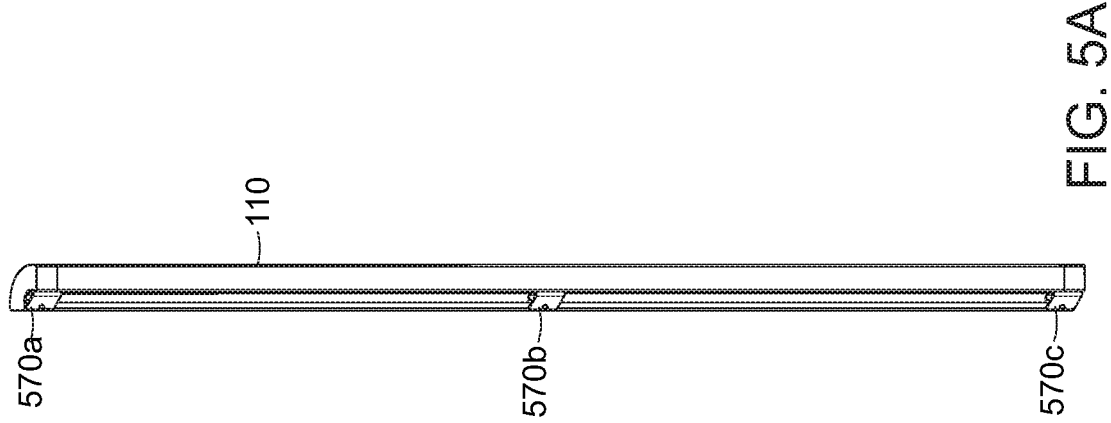
FIG. 5A is a rear isometric view of a wall-mounted lighting unit configured in accordance with an embodiment of the present technology.

FIG. 5C is an end view of a wall-mounted lighting unit 510 configured in accordance with another embodiment of the present technology. In the illustrated embodiment, the lighting unit 510 is at least generally similar in structure and function to the lighting unit 110 described in detail above. For example, the lighting unit 510 includes the cover 232 which is attached to the base 530 and encloses the lighting element 234. In this particular embodiment, however, the longitudinal recess 231 on the backside of the base 530 includes two longitudinal grooves 579 on opposite sides thereof that are configured to receive the outwardly disposed edges 578 of two legs 577 which extend from a mounting bracket 576. The mounting bracket 576 can include one or more fasteners 572 (e.g., threaded fasteners, such as a screw or a bolt) for mounting the bracket 576 to a wall of the residential garage 100 or other location. To mount the lighting unit 510 to a wall in a desired location, two or more of the brackets 576 are first attached to the wall in alignment with each other by means of the fasteners 572. The base 530 of the lighting unit 510 is then pressed on to the bracket 576 so that the edges 578 snap into the opposing grooves 579. The bracket 576 can be formed from, for example, spring steel or another suitably resilient metal or plastic so that the outward bias of the resilient legs 577 retains the edges 578 in the grooves 579, to thereby secure the lighting unit 510 to the bracket 576 and, accordingly, to the adjacent wall. As will be appreciated, in this embodiment the magnets 240 (FIG. 5B) can be omitted from the lighting unit 510 as they are not needed to physically attach the lighting unit 510 to the bracket 576.

Figure 6:
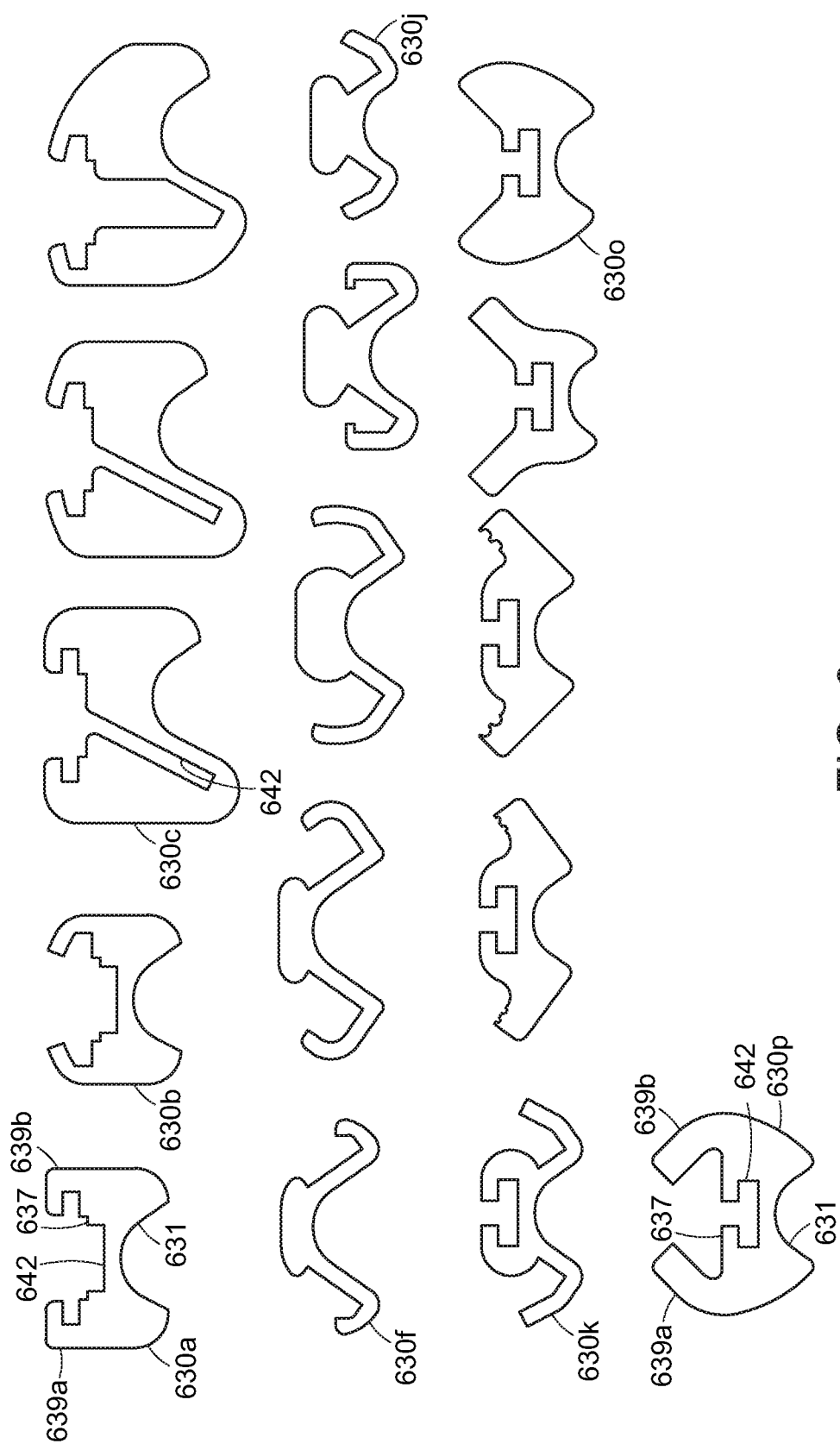
FIG. 6 includes a series of cross-sectional end views illustrating various lighting unit bases configured in accordance with embodiments of the present technology.

FIG. 6 includes a series of cross-sectional end views illustrating various lighting unit bases 630a-630p configured in accordance with embodiments of the present technology. As these views illustrate, in some embodiments each of the bases 630 can have common features. For example, each of the bases 630 can include a concave exterior surface or recess 631 having a rounded shape configured to receive and mount to a conventional door track guide rail (e.g., the guide rail 250 of FIG. 2C), a mounting surface 637 for attachment of a corresponding lighting element (e.g., an LED light strip), a cavity 642 for receiving and retaining a magnet (not shown) for attaching the base 630 to, e.g., a door guide rail, and/or sidewalls 639 (identified individually as a first sidewall 639a and a second sidewall 639b) or other features for mounting a cover over the lighting element. Beyond these features, however, FIG. 6 illustrates that lighting unit bases configured in accordance with the present technology can have a wide variety of different shapes to meet a particular application or applications. For example, the position of the magnet cavity 642 can differ to accommodate different light mounting locations/arrangements, the position or orientation of the LED mounting surface 637 can differ to provide different light projection patterns, and the sidewalls 639a, b can have different shapes and/or features to mount different lenses or diffuser attachments. In addition to providing various types of beneficial lighting, the various embodiments of lighting units described herein can also include other useful features, such as a feature (e.g., one or more holes, clips, and/or mounting surfaces) for mounting a storage shelf to one or more of the lighting units, or for mounting equipment, such as gardening equipment, to one or more of the lighting units.

As described above with reference to FIG. 1A, in some embodiments the lighting units 110 can be operably connected to the power circuit of the garage door opener 120. By way of example, FIG. 7A is an isometric view of the housing 122 of the garage door opener drive unit 121. As this view illustrates, the housing 122 includes a translucent or transparent cover 124 that encloses a conventional light socket 782. The light socket 782 can receive power from the garage door opener electrical circuit via a wired connection 784.

Figure 7B:
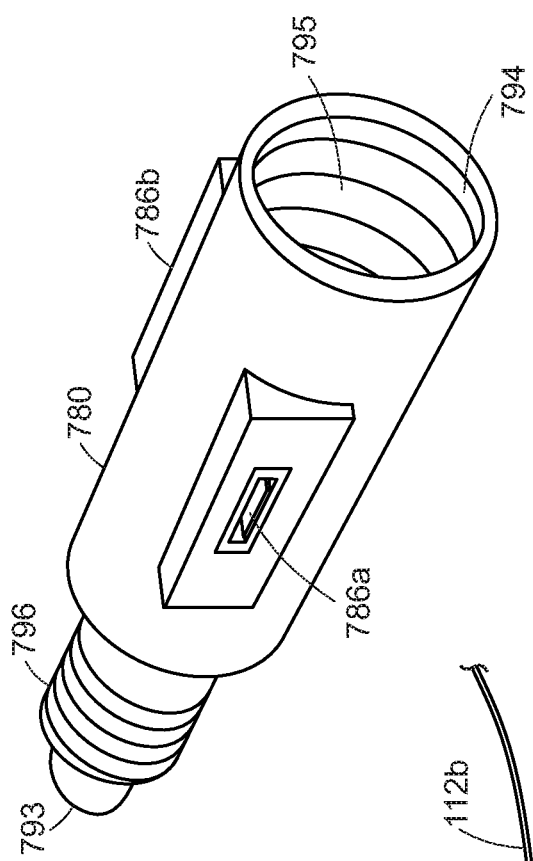
FIG. 7B is an enlarged isometric view of the adapter of FIG. 7A configured in accordance with embodiments of the present technology.
Figure 7A:
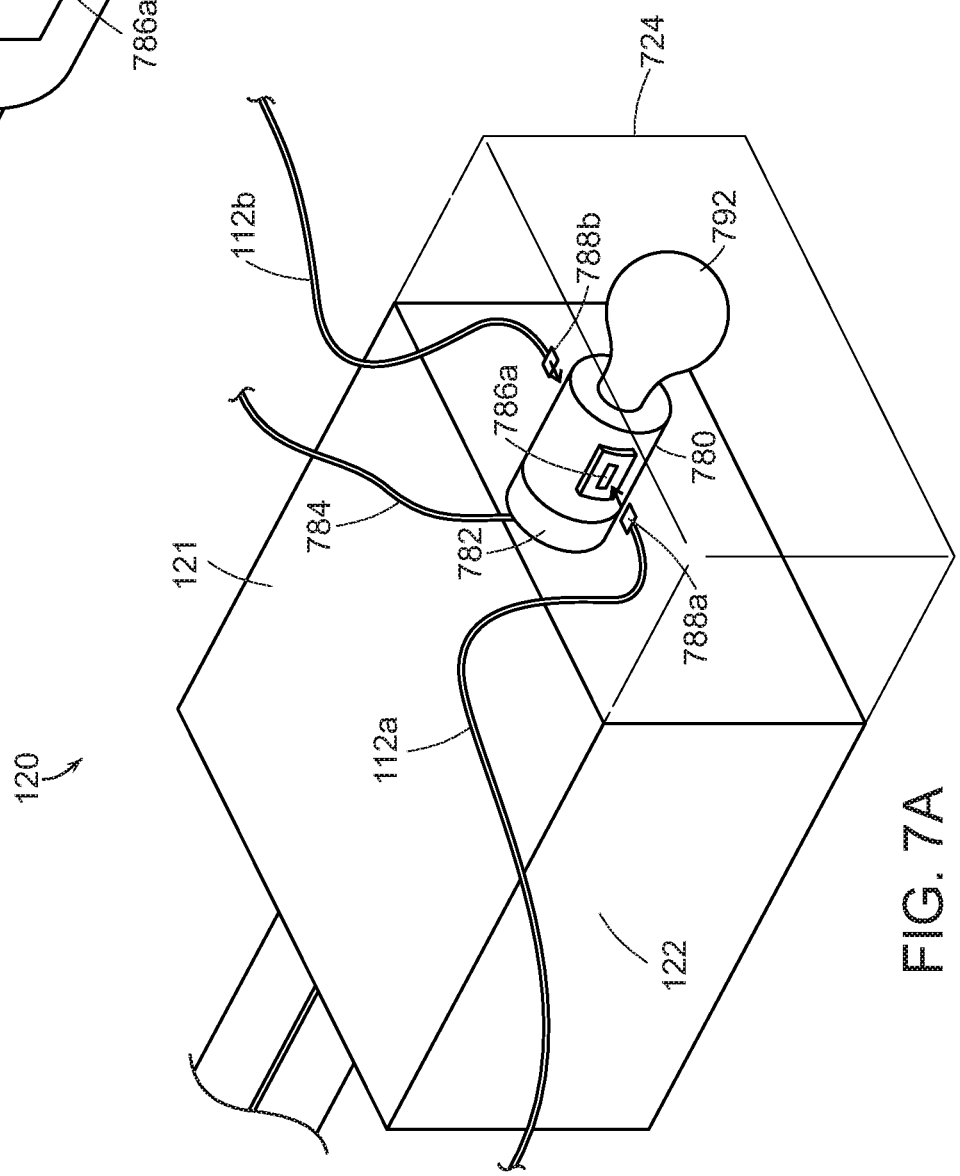
FIG. 7A is a partially schematic isometric view of a door opener drive unit having an electrical adapter for providing power to lighting units configured in accordance with embodiments of the present technology.

FIG. 7B is an enlarged isometric view of an adapter 780 configured in accordance with an embodiment of the present technology. In the illustrated embodiment, the adapter 780 includes male threads 796 and an external electrical contact 793 on one end thereof, and a socket 795 having female threads 794 and a corresponding internal electrical contact (not shown) on the opposite end thereof. Additionally, the adapter 780 further includes two electrical receptacles 786 (identified individually as receptacles 786a and 786b) on opposite sides thereof. The receptacles 786 are electrically connected to the electrical circuit between the external electrical contact 793 and the internal electrical contact within the socket 795. The receptacles 786 can be configured to receive corresponding connectors 788 (identified individually as male connectors 788a and 788b), as shown in FIG. 7A. In some embodiments, the receptacles 786 can be standard USB ports and the connectors 788 can be standard USB connectors. In other embodiments, the receptacles 786 and/or the connectors 788 can include other types of suitable electrical connectors known in the art.

Referring next to FIGS. 7A and 7B together with FIG. 1A, although the light socket 782 is configured to normally receive a light bulb 792 in a conventional manner, in the illustrated embodiment the male threads 796 of the adapter 780 are threaded into the socket 782, and the light bulb 792 is threaded into the socket 795 of the adapter 780. Once the lighting units 110 have been mounted to the door tracks 106 as shown in, for example, FIG. 1A, the respective leads 112a and 112b can be operably electrically connected to the adapter 780 by inserting the connectors 788a and 788b into the corresponding receptacles 786a and 786b.

As those of ordinary skill in the art will appreciate, in normal operation the garage door opener 120 includes an electrical circuit that energizes the light bulb 792 to illuminate the residential garage 100 when the drive unit 121 is activated to raise or lower the sectional door 107 (FIG. 1A). Additionally, the garage door opener circuitry can include, for example, a suitable microprocessor, timer, etc. that delays turning off the light bulb 792 for a predetermined period of time after the door 107 has been fully opened or fully closed. This feature keeps the garage 100 illuminated after a person has parked their car in the garage 100 and perhaps while they remove articles from the back seat or trunk and exit the garage. Since the lighting units 110 are connected to the same power circuit as the light bulb 792 by virtue of the adapter 780, the lighting units 110 remain on as long as the light bulb 792 remains on. Accordingly, the adapter 780 can be used in accordance with the present technology as a means for easily connecting the lighting units 110 to the existing power circuit of the garage door opener 120 in a manner that results in simultaneous operation of the two systems to provide enhanced illumination of the garage 100.

Figure 8:
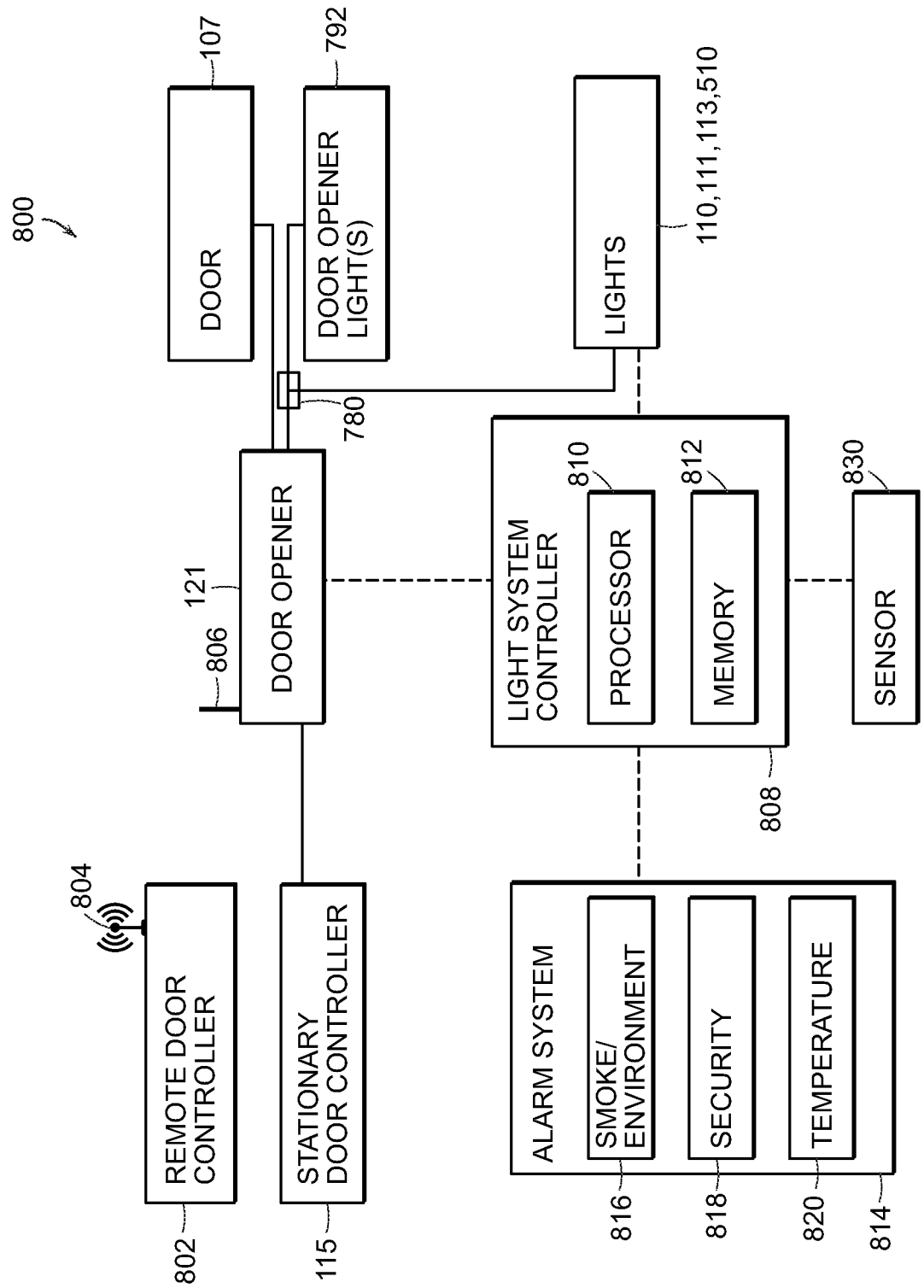
FIG. 8 is a schematic diagram of a suitable electrical system for operating lighting units and other devices configured in accordance with embodiments of the present technology.

FIG. 8 is a schematic diagram of a suitable environment 800 for operating the lighting units 110, 111, 113, 510, 910 and/or 1010 described in detail above. In some embodiments, the environment 800 can include the wall-mounted door control switch 115 described above with reference to FIG. 1A, and a remote door controller 802. The remote door controller 802 can be a conventional hand-held remote garage door opening device having a wireless transmitter 804 for transmitting wireless control signals to a corresponding receiver 806 (e.g., an antenna) operably coupled to the door opener drive unit 121. The drive unit 121 can include one or more controllers and/or other processing devices, timers, etc. as are well known in the art for opening and closing the door 107 and operating the door opener light 792 in response to control signals received from the remote door controller 802 or the stationary control switch 115. As described above with reference FIGS. 7A and 7B, in some embodiments the lighting units 110, 111, 113 and/or 510 can be electrically connected to the power circuit of the door opener light 792 via the adapter 780.

In some embodiments, the environment 800 can additionally include a light system controller 808 that can be operably connected to the lighting units 110, 111, 113 and/or 510, as well as to the door opener drive unit 121. In some embodiments, the light system controller can be mounted to or proximate one of the lighting units 110, 111, 113 and/or 510. In other embodiments, the light system controller 808 can be mounted to or proximate the drive unit 121, or in another accessible location in the garage 100. The light system controller 808 can include a processor 810 that is configured to execute computer readable instructions stored on memory 812. The processor 810 can be any logic processing unit, such as one or more programmable logic controllers (PLC), digital signal processors (DSPs), application-specific integrated circuits (ASIC), central processing units (CPUs), etc.

In some embodiments, the environment 800 can also include one or more alarm systems 814. The alarm systems 814 can include, for example, smoke and/or gas (e.g., carbon dioxide) detectors 816 that transmit a signal to the light system controller 808 in response to, for example, smoke detection, harmful gas detection, etc. and/or other potential emergency conditions. The alarm systems 814 can also include one or more temperature sensors 820 that can transmit a corresponding signal to the light system controller 808 in the event that the temperature in the garage 100 is too high or too low for safe occupancy, and/or one or more security sensors 818 that transmit a corresponding signal to the light system controller 808 in the event that a door or window of the garage 100 has been breached by, for example, a burglar.

The environment 800 enables the lighting units 110, 111, 113 and/or 510 described herein to be used in a wide variety of different ways. For example, as described above the lighting units can be configured to illuminate in unison with the garage door light 792 when the drive unit 121 is activated. In other embodiments, the processor 810 can execute computer readable instructions stored on the memory 812 that control power to the lighting units 110 so that they flash or change color (e.g., change from white light to red light) in response to a signal from the smoke alarm 816 or the security alarm 818. For example, in some embodiments the lighting units 110 can be configured to flash red and white indicating a fire alarm in response to a signal from the smoke detector 816. Alternatively, the lighting units 110 can be configured flash red and blue to indicate a breach of the security system in response to a signal from the security alarm 818. Note that because the lighting units can include LED light strips, the processor 810 can cause the light strips to display a wide variety of different colors in different sequences by varying the applied voltage accordingly. In other embodiments, the lighting units 110 can be configured to flash white and white, or display other visual signals in response to other inputs, such as the ringing of a doorbell at the associated residence, or in response to a sensor indicating a vehicle has been fully parked inside the garage 100. In such an embodiment, the lighting units may display yellow while the vehicle is being parked in the garage 100, and then change to green once the vehicle has been correctly parked in the proper location.

Although, in some embodiments described above the lighting units 110 can be activated in response to operation of the door opener drive unit 121, in other embodiments, the lighting units 110 can be activated in response to other signals and inputs. For example, in some embodiments the environment 800 can further include a sensor 830 that is operably connected to the light system controller 808. The sensor 830 can be a motion sensor that is positioned, for example, proximate or adjacent to the garage door 107 and configured to detect movement (e.g. opening) of the door and send a corresponding signal to the controller 808. The controller 808 can respond to the signal by activating the lighting units 110 so that the garage is illuminated when the door opened. Similarly, the sensor 830 (or another sensor) can be configured to detect door closure and send a corresponding signal to the controller 808 to deactivate the lights in response thereto. It will be appreciated that the foregoing embodiments are provided by way of example only, and that embodiments of the lighting units and systems described herein can be turned on and off in a variety of different ways without departing from the present disclosure.

FIG. 8 and the foregoing discussion provide a brief, general description of a suitable computing environment in which the invention can be implemented. Although not required, aspects of the invention are described in the general context of computer-executable instructions, such as routines executed by a general-purpose data processing device. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, multi-processor systems, microprocessor-based or programmable consumer electronics, mini-computers, and the like. Indeed, the terms "computer," "processor" and the like are generally used interchangeably herein, and refer to any of the above devices and systems, as well as any data processor. Although specific circuitry is described above, those or ordinary skill in the art will recognize that a microprocessor-based system could also be used where any logical decisions are configured in software. Unless described otherwise, the construction and operation of the various blocks shown in FIG. 8 are of conventional design. As a result, such blocks need not be described in further detail herein, as they will be readily understood by those skilled in the relevant art.

Figure 9A:
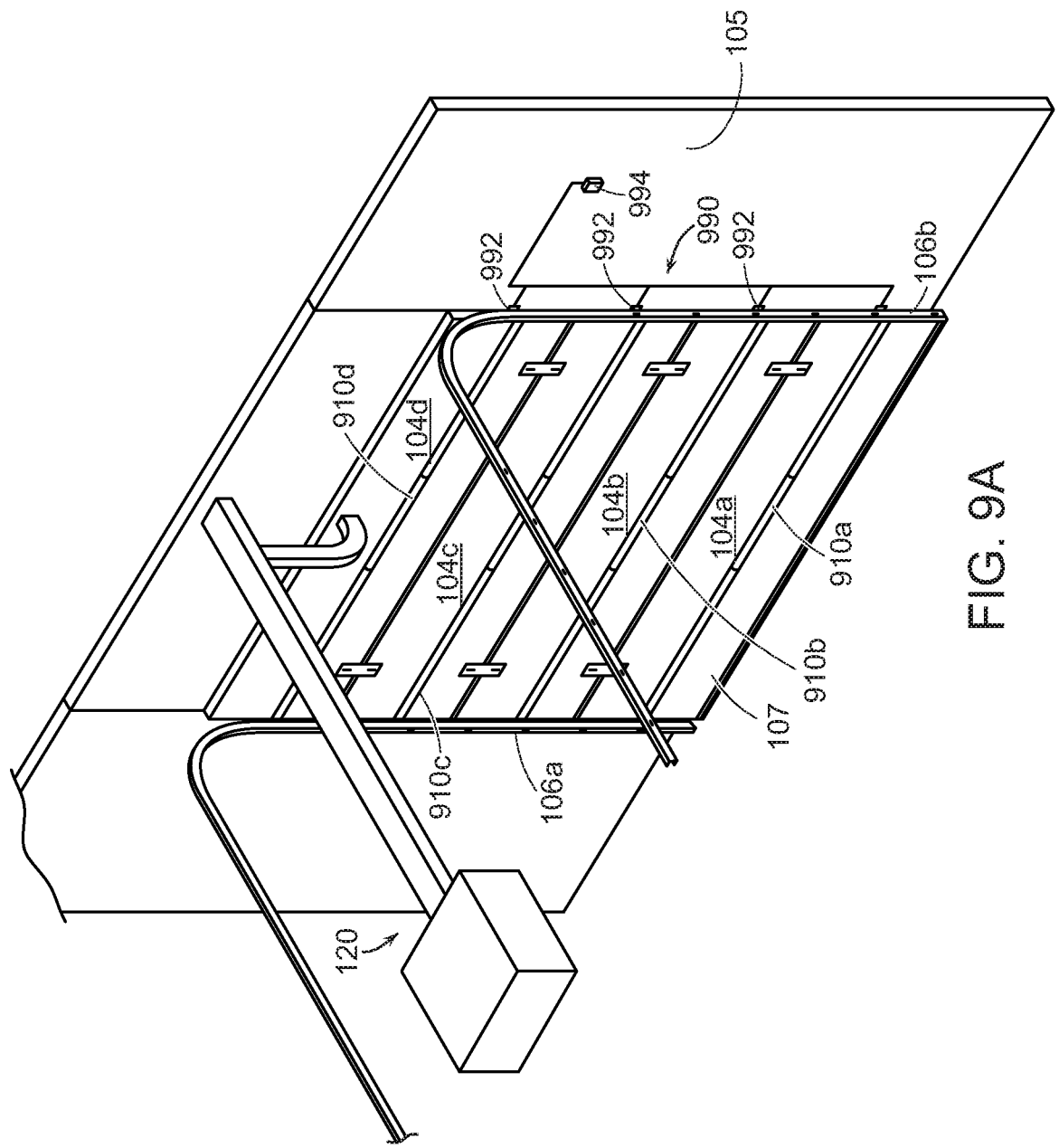
FIG. 9A is a partially schematic isometric view of a sectional garage door having a plurality of lighting units mounted thereto in accordance with an embodiment of the present technology.
Figure 9B:
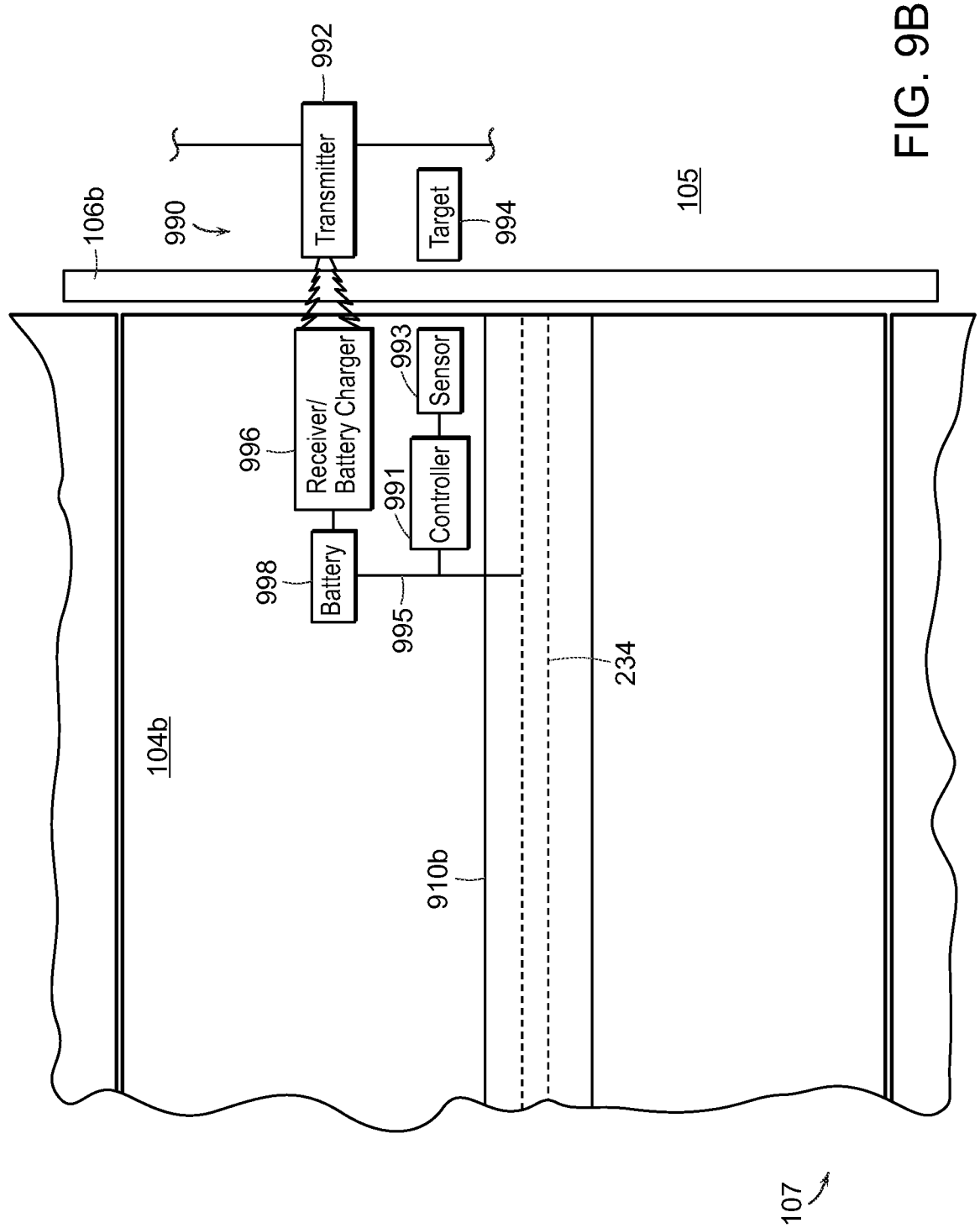
FIG. 9B is a partially schematic view of a lighting unit wireless recharging system configured in accordance with an embodiment of the present technology.
Figure 9C:
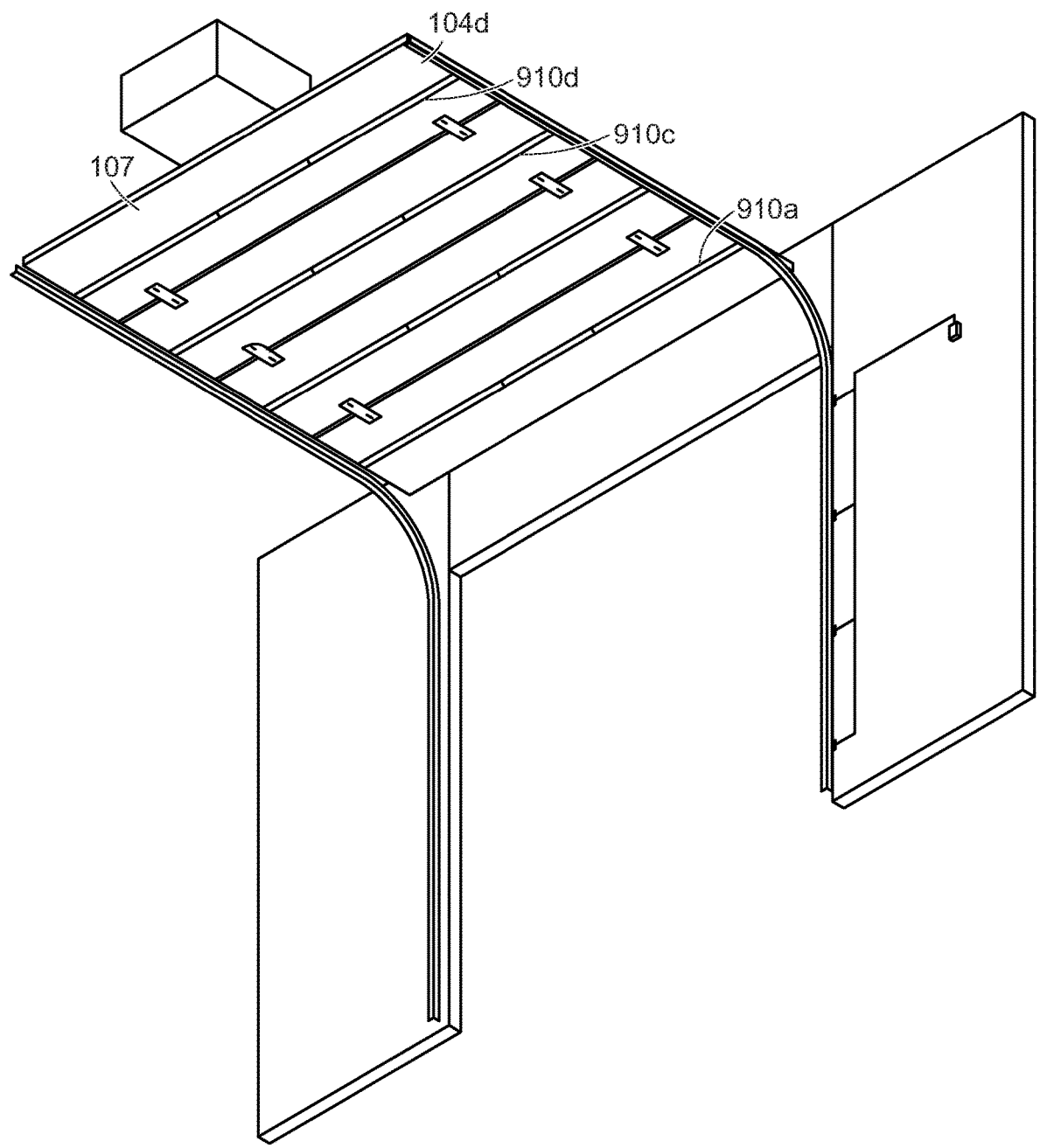
FIG. 9C is a partially schematic isometric view of the sectional garage door of FIG. 9A in an open position.

FIG. 9A is an isometric view of the overhead sectional door 107 described above with reference to FIG. 1A with a plurality of lighting units 910*a*-*d* mounted thereto in accordance with an embodiment of the present technology. FIG. 9B is a partially schematic view illustrating a wireless charging system 990 that can be used with the lighting units 910*a*-*d* in accordance with an embodiment of the present technology, and FIG. 9C is an isometric view of the sectional door 107 in an open or overhead position. Referring first to FIG. 9A, as described above the sectional door 107 includes door panels 104*a*-*d*, which are moveably coupled to left- and right-side door tracks 106*a* and 106*b*, respectively. In the illustrated embodiment, each of the lighting units 910 is mounted horizontally to a corresponding one of the door panels 104 and, in some embodiments, can extend across the full width of the sectional door 107. In some embodiments, each of the lighting units 910 can be at least generally similar in structure and function to the lighting unit 110 and/or other of the lighting units described in detail above and can include, for example, one or more LED light strips mounted to a suitable base and enclosed within a suitable transparent or semi-transparent cover. In some embodiments, the lighting units 910 can be mounted to the door panels 104 using one or more of the mounting systems described above, such as the mounting systems described above with reference to FIGS. 5A-5C.

In some embodiments, each of the lighting units 910 can include a corresponding battery (or two or more of the lighting units can share a battery; batteries not shown in FIG. 9A) that can be recharged by the wireless recharging system 990. Additionally, each of the lighting units 910 can be activated by one or more sensors (e.g., an accelerometer, an infrared position sensor, etc.) that detects movement of the sectional door 107 away from the closed position (and/or away from the opened position), at which time the lighting units are illuminated by means of the one or more batteries. In the illustrated embodiment, the wireless recharging system 990 can include a power source 994 that is operably connected (e.g., via a wired connection) to a plurality of wireless transmitters 992 that are mounted to the wall 105 or the door track 106*b* proximate one or more of the lighting units 910.

FIG. 9B is a partially schematic diagram illustrating the wireless recharging system 990 configured in accordance with an embodiment of the present technology. In the illustrated embodiment, the wireless recharging system 990 can include one or more of the wireless transmitters 992 mounted to either the wall 105 or the door track 106*b*. In some embodiments, the recharging system 990 further includes a wireless receiver/battery charger 996 that is operably connected to a battery 998, which in turn is electrically connected to the lighting element 234 via a circuit 995. In the illustrated embodiment, the wireless receiver/battery charger 996, and the battery 998, can be mounted to the door panel 104b proximate the lighting unit 910b, or these components can be integrated into the lighting unit 910b (e.g., positioned under the light cover 232 and/or in the base 230). In addition to the foregoing components, the sectional door 107 can further carry a sensor 993 (e.g., an infrared sensor) that is configured to detect the presence of a target 994 (e.g., an infrared target) that is mounted to the wall 105 in a location that is proximate the sensor 993 when the door 107 is in the closed position. The sensor 993 can in turn be connected to a controller 991 (e.g., a programmable logic controller (PLC), microprocessor and/or other suitable processing device) that controls operation of the battery circuit 995.

In operation, when the door 107 is in the closed position shown in FIG. 9A, the transmitter 992 can wirelessly transmit power to the receiver/battery charger 996 in a manner known in the art. Similarly, the receiver/battery charger 996 can in turn use this power to recharge the battery 998. If the sectional door 107 is opened (e.g., via the garage door opener 120 of FIG. 1A), the sensor 993 detects movement of the sectional door 107 away from the target 994, and transmits a corresponding signal to the controller 991, which in turn closes the circuit 995 and allows the battery 998 to energize the lighting element 234 of the lighting unit 910b. Accordingly, the lighting unit 910b (and the other lighting units 910 mounted to the sectional door 107) will illuminate upon movement of the sectional door 107 to the open or overhead position shown in FIG. 9C. In some embodiments, the lighting units 910 can remain illuminated the entire time that the sectional door 107 is open. In other embodiments, the controller 991 can include a suitable timer or clock that opens the circuit 995 to turn off the lighting elements 234 after a predetermined period of time (e.g., about 10 seconds to about 5 minutes, or about 1 minute). When the sectional door 107 is moved downwardly back into the closed position as shown in FIG. 9A, the sensor 993 detects the presence of the target 994 and sends a corresponding signal to the controller 991 which in turn opens the circuit 995 to turn off the lighting elements 234. In some embodiments, as noted above, the controller 991 can include a suitable timer that leaves the lighting elements 234 illuminated for a predetermined period of time (e.g., about 1 minute) after the door 107 is closed. In other embodiments, the lighting unit batteries 998 can be recharged using other systems, such as wired recharging circuits that operably connect to the batteries 998 via a passive electrical connection (e.g., a contact switch) when the door 107 is stationary (e.g., closed).

Figure 10A:
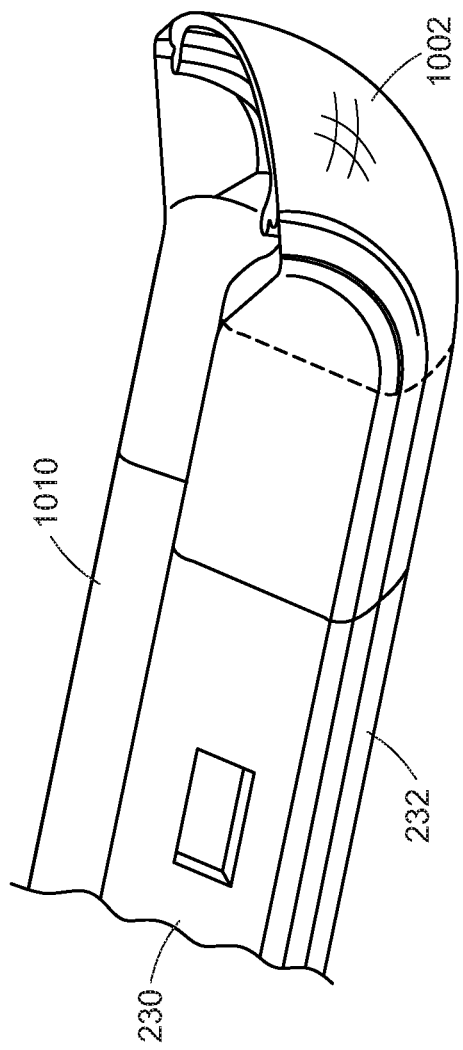
FIGS. 10A and 10B are isometric and cross-sectional isometric views, respectively, of a lighting unit having a curved end cover configured in accordance with an embodiment of the present technology.
Figure 10B:
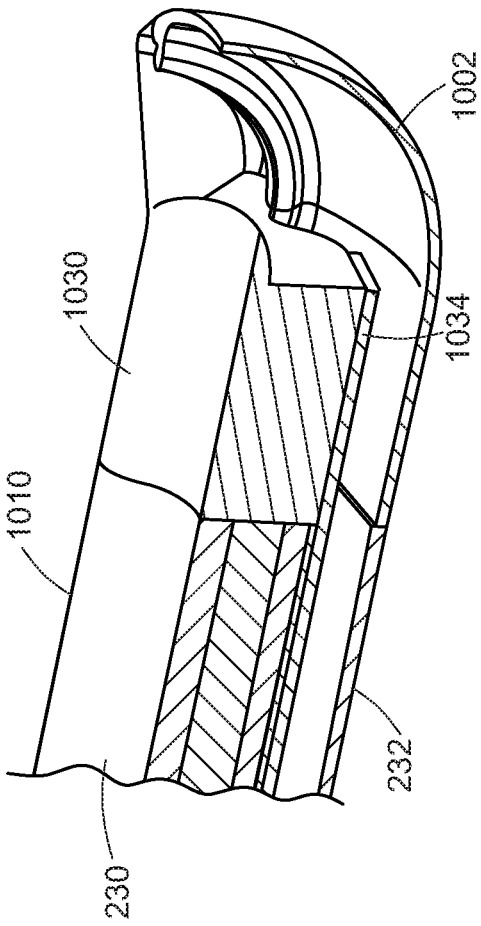

FIGS. 10A and 10B are an isometric view and a cross-sectional isometric view, respectively, of an end portion of a lighting unit 1010 having a curved lens or cover 1002 configured in accordance with an embodiment of the present technology. Referring to FIGS. 10A and 10B together, the lighting unit 1010 can be at least generally similar in structure and function to the lighting unit 110 and/or any of the other lighting units described in detail above. For example, the lighting unit 1010 includes a transparent or translucent cover 232 that encloses a portion of a lighting element 234 mounted to a base 230. In this particular embodiment, however, the lighting unit 1010 further includes an end member 1030 that supports an end portion of the lighting element 1034 and a corresponding curved transparent or semi-transparent end cover 1002. The end member 1030 can have generally the same cross-sectional shape as the base 230 so that it can fit against a door guide rail as described above. In one aspect of this embodiment, the curved end cover 1002 enables the lighting element 1034 to broadly project light both downwardly from the lighting unit 1010 but additionally outwardly from the end portion of the lighting unit 1010 to increase the illumination of corresponding portions of the garage.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the technology can also be practiced in distributed environments where functions or modules are shared among disparate processing devices, which are linked through a communications network, such as a Local Area Network (LAN) or a Wide Area Network (WAN).

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A lighting unit for use with a door track of an overhead sectional door, the door track including an elongate guide rail having a curved cross-sectional shape configured to receive a guide for the overhead door, the lighting unit comprising:
   a base, wherein the base includes a longitudinal recess having a cross-sectional shape that is complimentary to a curved exterior surface of the guide rail and is configured to receive the guide rail;
   an elongate lighting element mounted to the base; and
   at least one attachment device, wherein the at least one attachment device is configured to attach the base to the curved exterior surface of the guide rail so that the elongate lighting element extends longitudinally along a length of the door track.

2. The lighting unit of claim 1 wherein the at least one attachment device is configured to attach the base to the curved exterior surface of the guide rail in the absence of any mechanical fastening means.

3. The lighting unit of claim 1 wherein the at least one attachment device includes one or more magnets.

4. The lighting unit of claim 3 wherein the one or more magnets are carried within the base of the lighting unit.

5. The lighting unit of claim 1 wherein the door track includes a vertical section adjacent an opening into a building and a horizontal section that extends above the opening, and wherein the at least one attachment device is configured to attach the base to an exterior surface of the horizontal section of the door track.

6. The lighting unit of claim 1 wherein the lighting element has a length of from about two feet to about five feet.

7. The lighting unit of claim 1 wherein the lighting element is configured to activate in response to opening of the overhead door.

8. The lighting unit of claim 1 wherein the overhead door is operably coupled to a drive unit configured to open and close the overhead door, and wherein the elongate lighting element is operably connected to the drive unit and configured to activate in response to activation of the drive unit.

9. A lighting unit for use with a door track of an overhead sectional door, wherein the door track includes an elongate guide rail having a curved cross-sectional shape configured to receive a guide for the overhead door, and wherein the lighting unit comprises:
   a base, wherein the base is an elongate member having a longitudinal recess with a curved cross-sectional shape that is complimentary to the curved cross-sectional shape of the guide rail and is configured to fit against the guide rail;
   an elongate lighting element mounted to the base; and
   at least a first magnet contained within a first end portion of the base and a second magnet contained within a second end portion of the base, wherein the first and second magnets are configured to attach the base to guide rail so that the elongate lighting element extends longitudinally along a length of the door track.

10. The lighting unit of claim 1 wherein the elongate lighting element is an LED that extends from a first end portion of the base to a second end portion of the base, and wherein the lighting unit further includes an elongate translucent or transparent cover that extends over the length of the LED.

11. A system comprising:
   a door track adjacent an opening in a building;
   a door movably coupled to the door track; and
   a lighting unit, wherein the lighting unit includes
      a base having a surface portion with a cross-sectional shape that is complimentary to an exterior surface of the door track;
      an elongate lighting element that is mounted to the base and extends longitudinally relative to the door track; and
      at least one magnet carried by the base and configured to attach the base to the exterior surface of the door track.

12. The system of claim 11 wherein the door track includes a vertical section adjacent the opening and a horizontal section that extends away from the opening, and wherein the lighting unit is attached to an exterior surface of the vertical section.

13. The system of claim 11 wherein the door track includes a vertical section adjacent the opening and a horizontal section that extends away from the opening, and wherein the lighting unit is attached to an exterior surface of the horizontal section.

14. The system of claim 11, further comprising a door opener having a drive unit operably coupled to the door, wherein the lighting element is operably connected to the drive unit and configured to activate in response to activation of the drive unit.

15. The system of claim 14 wherein the lighting element is a first lighting element, and wherein the system further comprises a light adapter operably connected to the drive unit, wherein the light adapter is configured to receive a second lighting element positioned proximate to the drive unit, wherein the light adapter is further configured to receive an electrical connector operably connected to the first lighting element, and wherein the light adapter is configured to provide power to the first and second lighting elements in response to activation of the drive unit.

16. The system of claim 11 wherein the lighting unit is a first lighting unit having a first end portion, and wherein the system further includes a second lighting unit having a second end portion, wherein the second lighting unit is attached to an exterior surface of the door track adjacent to the first lighting unit, and wherein at least one of the first or second end portions are configured to be electrically and mechanically joined together so that the first and second lighting units extend end-to-end along the door track.

17. The system of claim 11, further comprising an alarm system operably connected to the lighting unit, wherein the lighting unit is configured to provide a visual alarm signal in response to detection of at least one of a hazardous condition in the building or a break-in at the building by the alarm system.

18. The lighting unit of claim 9 wherein the door track includes a vertical section adjacent an opening into a building and a horizontal section that extends above the opening, and wherein the at least one attachment device is configured to attach the base to an exterior surface of the horizontal section of the door track.

19. The lighting unit of claim 9 wherein the lighting element has a length of from about two feet to about five feet.

20. The lighting unit of claim 9 wherein the lighting element is configured to activate in response to opening of the overhead door.

21. The lighting unit of claim 9 wherein the overhead door is operably coupled to a drive unit configured to open and close the overhead door, and wherein the elongate lighting element is operably connected to the drive unit and configured to activate in response to activation of the drive unit.

* * * * *